United States Patent
Stam et al.

(10) Patent No.: US 6,774,988 B2
(45) Date of Patent: Aug. 10, 2004

(54) LIGHT SOURCE DETECTION AND CATEGORIZATION SYSTEM FOR AUTOMATIC VEHICLE EXTERIOR LIGHT CONTROL AND METHOD OF MANUFACTURING

(75) Inventors: Joseph S. Stam, Holland, MI (US); Jon H. Bechtel, Holland, MI (US); Spencer D. Reese, Fort Wayne, IN (US); Darin D. Tuttle, Byron Center, MI (US); Gregory S. Bush, Grand Rapids, MI (US); Harold C. Ockerse, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 21 days.

(21) Appl. No.: 10/208,142

(22) Filed: Jul. 30, 2002

(65) Prior Publication Data

US 2004/0021853 A1 Feb. 5, 2004

(51) Int. Cl.$^7$ .................................................. G01J 1/42
(52) U.S. Cl. .................... 356/218; 356/121; 250/208.1; 250/214 AL; 250/214 C; 382/104; 340/469; 362/465
(58) Field of Search ................................ 356/121, 122, 356/217–234, 151.1–151.3, 152.1–152.3; 250/208.1, 208.2, 214 AL, 214 C; 382/104; 340/468, 469, 435, 933, 942; 362/465, 466; 315/82, 77

(56) References Cited

U.S. PATENT DOCUMENTS

| | | |
|---|---|---|
| 2,632,040 A | 3/1953 | Rabinow |
| 2,827,594 A | 3/1958 | Rabinow |
| 4,139,801 A | 2/1979 | Linares |
| 4,236,099 A | 11/1980 | Rosenblum |
| 4,357,558 A | 11/1982 | Massoni et al. |
| 4,376,909 A | 3/1983 | Tagami et al. |
| 4,599,544 A | 7/1986 | Martin |
| 4,665,321 A | 5/1987 | Chang et al. |
| 4,692,798 A | 9/1987 | Seko et al. |

(List continued on next page.)

FOREIGN PATENT DOCUMENTS

| | | |
|---|---|---|
| DE | 2946501 | 5/1981 |
| FR | 2641237 | 7/1990 |
| FR | 2726144 | 4/1996 |
| JP | 8-166221 | 6/1990 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

*Primary Examiner*—Richard A. Rosenberger
*Assistant Examiner*—Vincent P. Barth
(74) *Attorney, Agent, or Firm*—James E. Shultz, Jr.

(57) ABSTRACT

The optical system of the present invention includes a lens system assembly, a spectral filter material and a pixel array configured such that small, distant, light sources can be reliably detected. The optical system of the present invention provides accurate measurement of the brightness of the detected light sources and identification of the peak wavelength and dominant wavelength of the detected light sources. Use of the optical system of the present invention provides the ability to distinguish headlights of oncoming vehicles and taillights of leading vehicles from one another, as well as, from other light sources.

114 Claims, 35 Drawing Sheets

U.S. PATENT DOCUMENTS

| | | |
|---|---|---|
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,967,319 A | 10/1990 | Seko |
| 5,036,437 A | 7/1991 | Macks |
| 5,072,154 A | 12/1991 | Chen |
| 5,086,253 A | 2/1992 | Lawler |
| 5,124,549 A | 6/1992 | Michaels et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,416,318 A | 5/1995 | Hegyi |
| 5,426,294 A | 6/1995 | Kobayashi et al. |
| 5,434,407 A | 7/1995 | Bauer et al. |
| 5,451,822 A | 9/1995 | Bechtel et al. |
| 5,471,515 A | 11/1995 | Fossum et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,614,788 A | 3/1997 | Mullins et al. |
| 5,660,454 A | 8/1997 | Mori et al. |
| 5,666,028 A | 9/1997 | Bechtel et al. |
| 5,715,093 A | 2/1998 | Schierbeek et al. |
| 5,796,094 A | 8/1998 | Schofield et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,912,534 A | 6/1999 | Benedict |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,049,171 A | 4/2000 | Stam et al. |
| 6,097,023 A | 8/2000 | Schofield et al. |
| 6,130,421 A | 10/2000 | Bechtel et al. |
| 6,144,158 A | 11/2000 | Beam |
| 6,396,397 B1 | 5/2002 | Bos et al. |
| 6,559,435 B2 * | 5/2003 | Schofield et al. ........ 250/208.1 |
| 2002/0040962 A1 | 4/2002 | Schofield et al. |

* cited by examiner

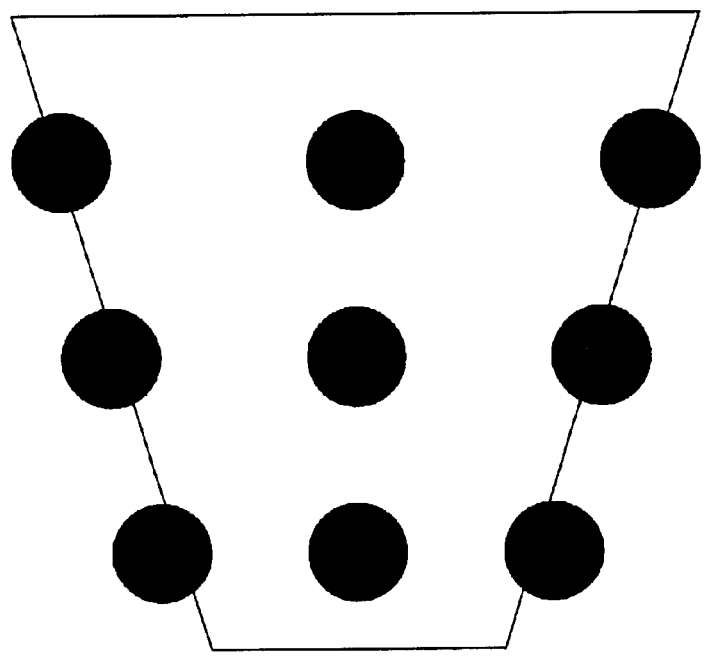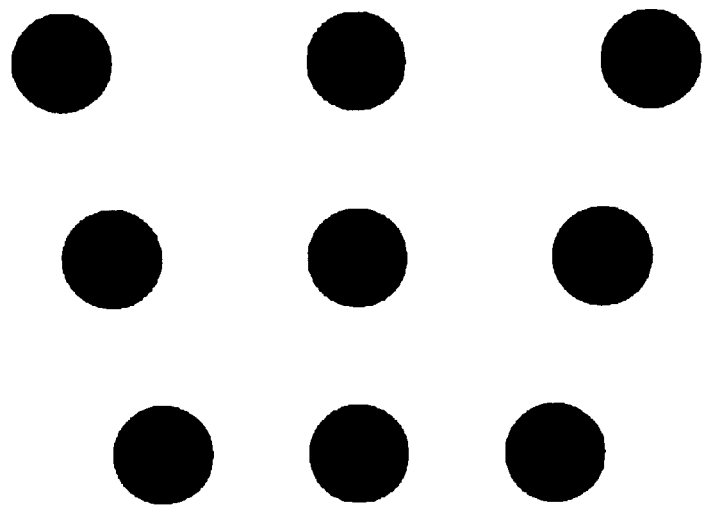
Fig. 29

LIGHT SOURCE DETECTION AND CATEGORIZATION SYSTEM FOR AUTOMATIC VEHICLE EXTERIOR LIGHT CONTROL AND METHOD OF MANUFACTURING

BACKGROUND OF THE INVENTION

The present invention relates to automatic vehicle exterior light control systems. More specifically, the present invention relates to light source detection and categorization systems for use with automatic vehicle exterior light control.

Automatic exterior light control systems for vehicles have been developed that utilize various light sensors and, or, an array of sensors (commonly referred to as an array of "pixels" or "pixel arrays") to control the state of external lights of a controlled vehicle. These systems may, for example, be employed to detect the headlights of oncoming vehicles and the taillights of leading vehicles and to dim, or switch, the high beam headlights of a controlled vehicle off when headlights or taillights are detected. An automatic exterior light control system is described in detail in commonly assigned U.S. patent application Ser. No. 09/800,460, to Stam et al., the disclosure of which is incorporated herein by reference. Automatic exterior light control systems employing a pixel array are capable of capturing images of the scene forward of the controlled vehicle and base the exterior light control decisions upon various aspects of the captured images.

Automatic exterior light control systems are required to accurately distinguish various features of a given scene to separately categorize scenarios which require control activity from scenarios which do not. For example, taillights of leading vehicles have to be distinguished from red traffic lights and red roadside reflectors. When the high beams of the controlled vehicle are on, it is desirous to automatically switch to low beams, or dim the high beams, when taillights of leading vehicles are detected. Conversely, detection of red traffic lights and red roadside reflectors should not invoke switching, or dimming, of the controlled vehicle's high beams.

A significant feature of sensors and optical systems for exterior light control relates to their ability to detect and accurately measure the brightness and color of small, distant, light sources. In order to perform satisfactorily, an optical system for such an application is preferably capable of identifying taillights of leading vehicles at distances of at least 100 meters and most preferably over 200 meters.

The resolution of an optical system is an important feature in accurately distinguishing between various objects within a given scene. The center-to-center distance between adjacent pixels of a pixel array is commonly referred to as the "pixel pitch." The given pixel pitch and the associated lens system design are two significant components in deriving the corresponding optical system resolution.

A typical taillight is about 10 cm in diameter, or less. The angle subtended by such a taillight, at 200 meters, when projected upon a sensor, or pixel array, of a sharply focused optical system, is approximately 0.03°. Typical pixel arrays, with associated lens systems for use in exterior vehicle light control applications, are designed to image 0.1°–0.5° horizontally and vertically per pixel. Consequently, with known optical systems, a projection of a taillight onto a typical pixel array may be of a size substantially less than that of one pixel pitch.

In known automatic vehicle exterior light control systems, the associated small size of projected, distant, light sources severely impairs the ability of the system to accurately determine the color and brightness of the corresponding light source. This is due largely to the fact that known sensors, and individual sensors of known pixel arrays, have a non-uniform response; depending upon the region of the pixel where light is incident, the sensitivity of the pixel will vary. For example, light falling on a transistor, or other structure that does not absorb photons, within the pixel will not be absorbed at all and thus will not be detected. Additionally, the given pixel may be more or less sensitive to light falling on various regions depending on the distance between the point where a photon is absorbed and the corresponding collection node to which the generated electrons must diffuse.

U.S. Pat. No. 6,005,619, to Fossum, titled "Quantum Efficiency Improvements in Active Pixel Sensors" and incorporated in its entirety herein by reference, describes the pixel structure of a photogate active pixel for use in a CMOS pixel array suitable for use in a vehicle exterior light control system. FIG. 26 depicts a group of four pixels from the Fossum device. As is readily seen from FIG. 26, there are several different materials and structures that form each pixel represented by 2600, 2602, 2604 and 2606. Thus, the sensitivity of the pixel to incident light rays varies depending upon the particular region of the pixel onto which photons are incident. As discussed above, micro-lenses may be employed to focus light rays on the most sensitive area of the pixel.

Pixel non-uniformity becomes especially problematic when attempting to determine the color and brightness of small, distant, light sources. For example, the optical system described in U.S. patent application Ser. No. 09/800,460 utilizes a lens system assembly with first and second lens systems. The first lens system projects the associated field of view onto one half of the associated pixel array and the second lens system projects substantially the same field of view onto the other half of the pixel array. A red spectral filter is placed in the optical system such that the light rays projected by the first lens system are red filtered. By comparing light rays projected through the red spectral filter with the unfiltered, or complementary filtered, light rays, a relative red color of each object within the field of view is determined. When the light sources are small, distant, sources, minor misalignment of the first lens system relative to the second lens system can cause significant error in the relative color measurement. The distant light source projected by the red spectral filtering lens system may be incident onto a sensitive region of a pixel, while the light source may be projected onto an insensitive region by the second lens system, causing an erroneously high redness value. In a subsequent image, the above scenario may be reversed causing an erroneously low redness value to be attributed to the light source. Consequently, distant taillight detection of known systems is less than satisfactory in certain scenarios.

Therefore, there remains a need in the art of automatic vehicle exterior light control systems for an optical system capable of more accurately detecting the brightness and color of small, distant, light sources.

SUMMARY OF THE INVENTION

According to a first embodiment of the present invention, a lens system is provided that projects light rays emitted by a small, distant, light source onto a sensor, or pixel array, such that the projected light rays substantially cover at least one entire sensor, or at least one pixel pitch, respectively.

The optical system in accordance with this first embodiment comprises a pixel array with an associated Nyquist frequency limit. The optical system has an associated spatial frequency cutoff. In the preferred optical system, the spatial frequency cutoff is less than, or equal to, the Nyquist frequency limit of the pixel array.

In another embodiment of the present invention, micro-lenses are placed proximate each pixel. Each micro-lens projects the corresponding incident light rays such that they are focused upon the most sensitive portion of the given pixel. In optical systems that employ a single sensor, or individual sensors not grouped into an array, it is preferred to use micro-lenses on each sensor.

As another alternative to the preceding embodiments, a light ray scattering film material is superimposed between the lens system assembly and the pixel array, or is integrated into the lens system assembly. Light rays projected by the lens system assembly toward the sensor, or pixel array, are scattered such that the projected light rays are incident more uniformly across the individual pixels.

In yet another embodiment of the present invention, spectral filtering material is incorporated into the optical system such that light rays in various spectral bands can be accurately categorized by color. Thereby, for example, red light sources can be distinguished from white light sources. Particular embodiments of the present invention are capable of discerning amongst light sources throughout the visible spectrum. In yet other embodiments, ultra-violet and infrared light rays are filtered and prevented from being projected onto the sensor, or pixel array. Preferably, the spectral filter material is a pigment, as opposed to a dye.

In yet another embodiment of the present invention, an optical system is provided with a pixel array having various spectral band filter material on individual pixels. In this embodiment, an optical system having a polychromatic modulation transfer function that first drops to $e^{-1}$ at a spatial frequency less than, or equal to, the reciprocal of the minimum center-to-center distance between any two similarly filtered pixels is preferred.

In one embodiment of the present invention, various external vehicle lights are used, such as high intensity discharge (HID), tungsten-halogen and blue enhanced halogen, to provide greater ability to distinguish reflections from various roadside reflectors and signs from headlights of on coming vehicles and taillights of leading vehicles. Particular spectral filter material is employed in combination with the external vehicle lights to produce desired results.

In a further embodiment of the present invention, a method of manufacturing an optical system is provided which insures that the lens system assembly is fixed proximate the sensor, or pixel array, in a precise position. An encapsulate block is transfer molded over the pixel array such that the encapsulate block is fixed to the associated circuit board. The encapsulate block provides an attachment surface for placement of the lens system assembly. A precision lens system placement machine is employed to move the pixel array relative to the lens system assembly; it is preferred to have the lens system assembly fixed in space with respect to a target and move the pixel array relative thereto, however, the pixel array may be fixed in space relative the target and the lens system assembly would be moved relative thereto. At the point the target is projected upon the pixel array as desired, the lens system assembly is fixed relative the pixel array preferably utilizing an ultraviolet light curable epoxy, or other adhesive.

In another embodiment of the manufacturing method of the present invention, a precision transfer molding apparatus is employed to transfer mold a lens system assembly proximate the pixel array. Molding the lens system assembly and the encapsulate block in one step simplifies the manufacturing method and results in lower cost.

In yet another embodiment of the manufacturing method of the present invention, a precision transfer molding apparatus is employed to transfer mold an encapsulate block with a precision lens system assembly mounting structure. A lens system assembly is provided with a mating mounting structure such that the lens system assembly can be "snap" fit into place. This manufacturing method provides for ease in lens system assembly replacement.

The preferred lens system is molded of polycarbonate to withstand the potentially high temperatures to which the optical system may be exposed in the automotive environment. The preferred transfer molded encapsulate block, or encapsulate block and lens when molded in combination, is formed from an epoxy material with low thermal expansion and high temperature stability to ensure that the optical system can withstand the automotive environment.

The features and advantages of the present invention will become readily apparent from the following detailed description of the best mode for carrying out the invention when taken in connection with the accompanying figures and appended claims.

BRIEF DESCRIPTION OF THE FIGURES

FIG. 29 depicts the target as described with regard to FIG. 23 when lens system is "tilted" in relation to the pixel array with regard to either the theta ("pitch") or alpha ("yaw") coordinates;

DETAILED DESCRIPTION OF THE INVENTION

Automatic vehicle exterior light control systems that employ optical systems to detect objects in a scene forward of the controlled vehicle are known. The detected objects are examined and categorized such that the exterior lights of the controlled vehicle can be controlled dependent upon the detected objects. One known automatic vehicle exterior light control system is described in detail in commonly assigned U.S. patent application Ser. No. 09/800,460, to Stam et al., the disclosure of which is incorporated in its entirety herein by reference. As used herein, the term "controlled vehicle" refers to the vehicle that has the automatic exterior light control system.

The optical systems in accordance with the present invention are capable of detecting small, distant, light sources and provide for more accurate brightness and color discrimination when compared to known systems. Thereby, the ability of the associated automatic vehicle exterior light control system to categorize the objects in the scene forward of the controlled vehicle is dramatically improved. As used herein, the term "light source" includes devices that emit light rays (i.e. headlights, taillights, streetlights, traffic signals, etc.), as well as, devices that reflect light rays (i.e. roadside reflectors, roadside signs, reflectors on vehicles, etc.). As used herein, the term "accurate" refers to the optical systems ability to predictably and reliably measure brightness and color of small, distant light sources that, in turn, facilitates predictable and reliable distinguishing of the headlights of oncoming vehicles and taillights of leading vehicles from one another and from other light sources.

Figure 1:
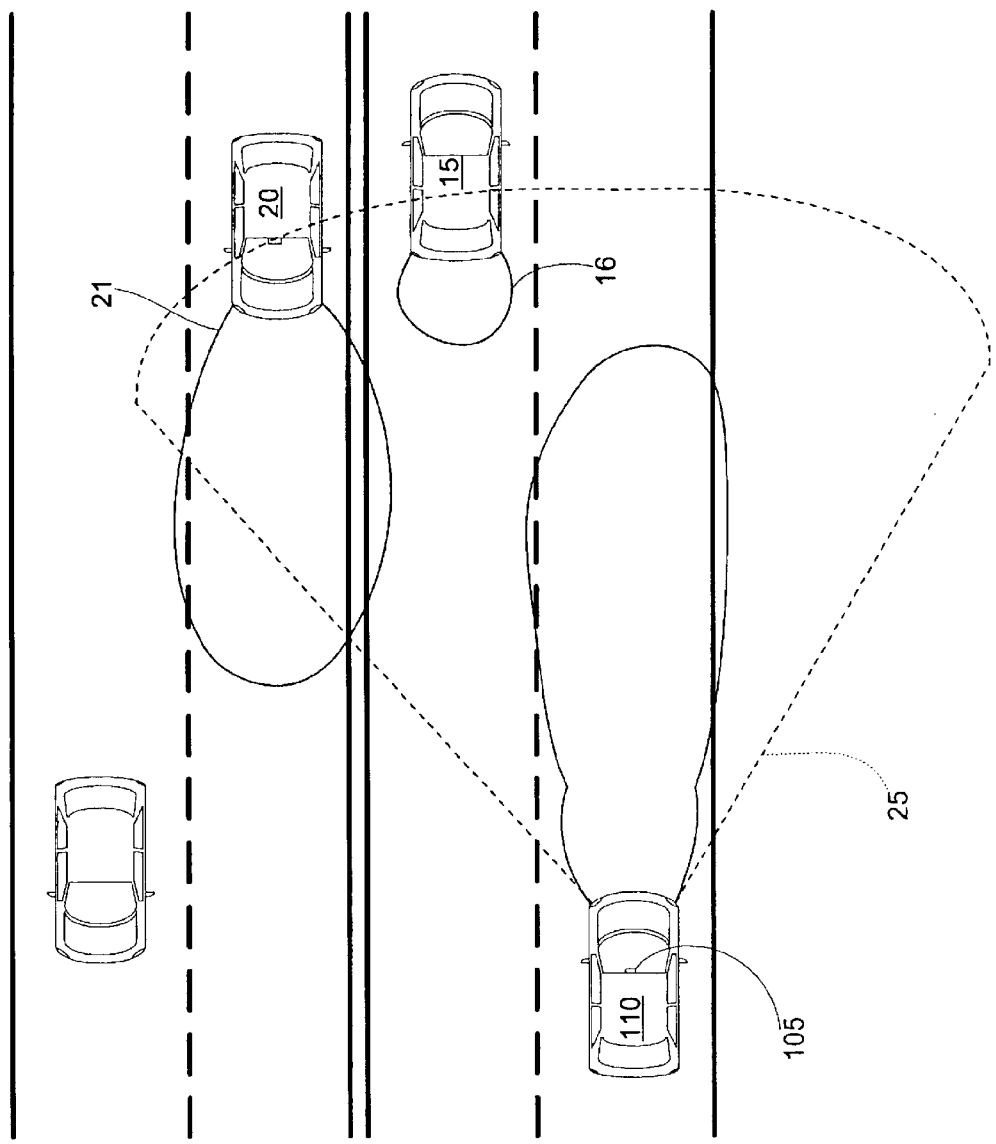
FIG. 1 depicts an optical system in accordance with the present invention, within a controlled vehicle, relative to the taillights of a leading vehicle.

Referring initially to FIG. 1, an optical system 105 in accordance with the present invention is shown within a controlled vehicle 110. The controlled vehicle 10 is shown in relation to a first vehicle 115, having taillights 116, leading the controlled vehicle at a distance of approximately 200 meters and a second vehicle 120, having headlights 121, approaching the controlled vehicle 110 from the opposite direction. The overall field of view of the optical system 105 is depicted in FIG. 1 to be within the dashed lines 125 extending from the front of the controlled vehicle 110.

Figure 2:
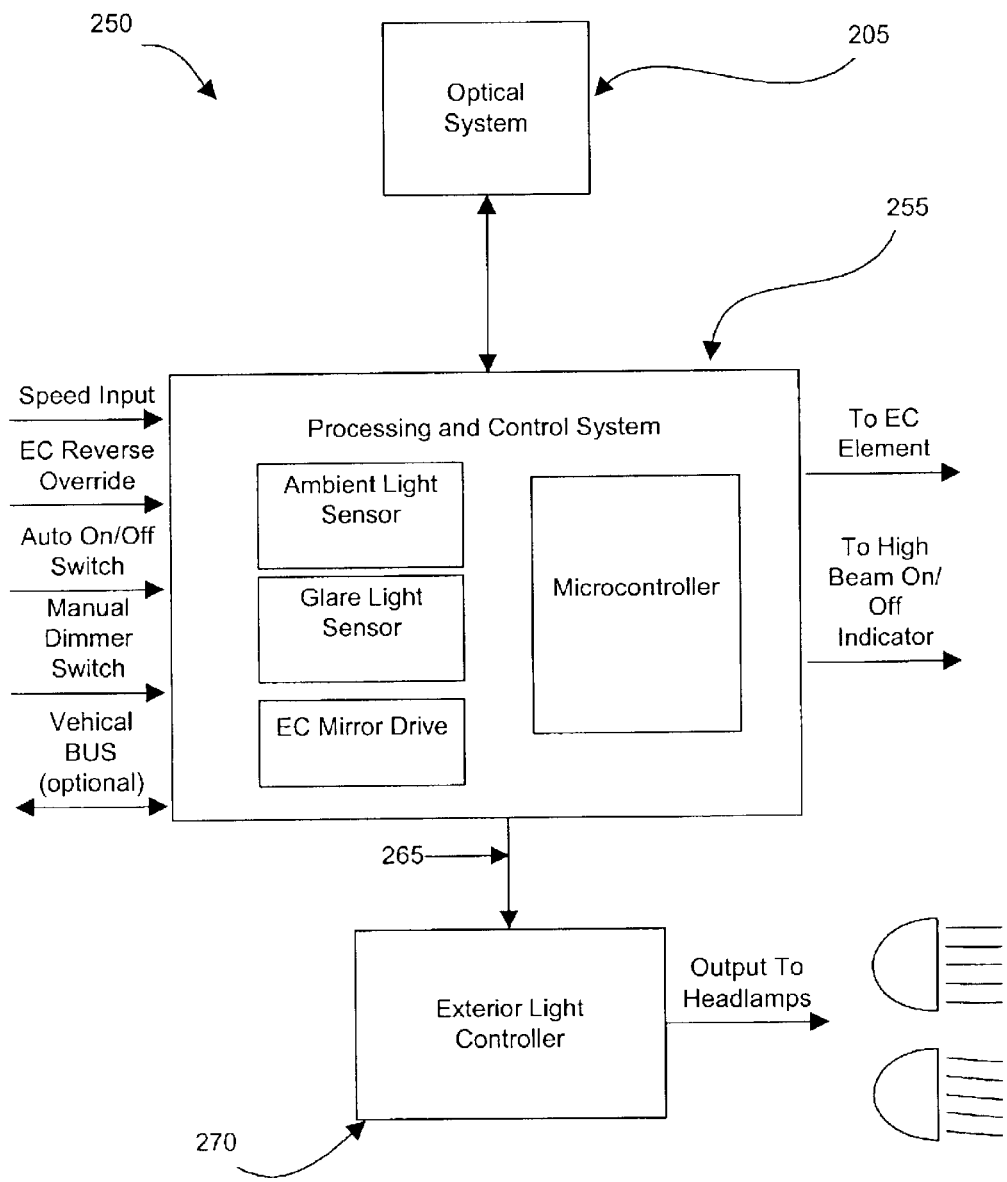
FIG. 2 depicts a block diagram of an automatic exterior light control system for a vehicle with an optical system in accordance with the present invention.

A block diagram of an automatic vehicle exterior light control system 250 is depicted in FIG. 2 including an optical system 205 in accordance with the present invention. As shown in FIG. 2, a processing and control system 255 is employed to control various parameters of the associated pixel array and to acquire and process digitized images obtained by the optical system 205. The processing and control system 255 ultimately generates control signals 265 which are transmitted to the associated controlled vehicle exterior light controller 270.

In general, optical systems in accordance with the present invention incorporate a lens system assembly, a spectral filter material system, and a pixel array mounted on a printed circuit board. The optical systems are preferably manufactured in accordance with methods that provide precise control of the placement of the lens system assembly relative the pixel array. The upper surface of the pixel array defines an "image plane."

The lens system assembly may include a single lens system or a plurality of lens systems. Each lens system may include a single optical surface or a plurality of cascaded lenses, each lens having associated optical surfaces. The lens system(s) may be permanently attached to the pixel array or may be detachable and replaceable. Various lens system assemblies in accordance with various embodiments of the present invention are depicted in FIGS. 3, 8, 10, and 13–20. Additional lens system assemblies will be apparent to those skilled in the art and are contemplated for use with the present invention. The lens system assemblies may include far field baffles, shutter stops, aperture stops and other structures that serve to affect the imaging performance of the system.

The spectral filter material system may comprise a single spectral band rejection characteristic or may comprise a plurality of spectral band rejection characteristics with individual pixels or groups of pixels within the pixel array being uniquely filtered. FIGS. 3, 8, 11a, 11b and 12 depict spectral filter material systems in accordance with various embodiments of the present invention. The optical systems in accordance with the present invention may have individual sensors, pixels, or groups of pixels filtered differently from others. The spectral filter materials may be of either the absorption or reflective type.

The pixel array may be a low resolution device with few, large, pixels or may be a high resolution device with many, small, pixels as described in more detail within the optical system examples contained herein. Multiple pixel arrays or image sensors manufactured either separately or in combination, each with potentially unique lens systems and spectral filter characteristics may be employed for automatic vehicle exterior light control in accordance with the present invention.

The pixel array may comprise individual sensors, or pixels, with varying size from one area of the array to other areas. The manufacturing methods in accordance with the present invention, as described in detail herein, provide for precisely focusing the optical system to achieve desired resolution. The resulting optical system may be sharply focused, defocused, nearsighted or farsighted.

Optical systems in accordance with the present invention that employ a plurality of lens systems may have all lens systems focused and filtered identically or may have each lens system uniquely focused and, or, uniquely filtered. The filtering may be provided on the individual pixels of a portion of the overall pixel array associated with a given lens system, may be interposed between the lens system and the pixel array or maybe integrated into the lens system assembly.

In operation, an optical system comprising a pixel array produces a "digitized image" of a corresponding scene within the field of view of the optical system. Light rays emanating from objects within the scene are projected by the lens system assembly onto the pixel array such that each pixel within the array is exposed to light rays corresponding to a segment of the overall scene. As will become apparent from the description of the optical systems contained herein, the digitized image is merely an approximation of the actual scene. The output of each pixel, which is proportional to the light rays incident thereon during a given period of time, is utilized by the corresponding digital image processing system to reconstruct the actual scene in the form of a digitized image. The size of the area, or segment, of the overall scene projected onto a given pixel determines the resulting resolution of the digitized image. As can be appreciated, if a large field of view is projected onto a small number of large pixels such that the output of each pixel represents a relatively big area, or segment, of the overall scene, the resulting digitized image will appear "grainy" and individual objects within the actual scene are likely to appear as one, collective, object in the digitized image, this is especially true with regard to small, distant, objects contained in the scene. Conversely, if a small field of view is projected onto a large number of small pixels such that the output of each pixel represents a relatively small area, or segment, of the overall scene, the resulting digitized image will appear "smooth" and individual objects within the actual scene will likely remain distinct within the digitized image.

A number of factors, in addition to the size of the field of view and the size of the individual pixels, influence an optical systems ability to detect small, distant, light sources. In an effort to provide a more clear understanding of the present invention, definitions of a number of terms as used herein are provided at this point.

The term "spatial frequency" is used herein to quantify the level of detail contained in a scene, measured herein in cycles per millimeter (cycles/mm) on the image plane. As an example, a scene containing a small number of alternating colored, wide, lines would be characterized as encompassing a low spatial frequency, while a scene containing a large number of alternating colored, narrow, lines would be characterized as encompassing a high spatial frequency. As a second example, a scene containing a small number of alternating colored, large, squares in a checkerboard pattern would be characterized as encompassing a low spatial frequency, while, a scene containing a large number of alternating colored, small, squares in a checkerboard pattern would be characterized as encompassing a high spatial frequency. The example with lines would be further characterized to be a one dimensional spatial frequency, while, the example with squares would be further characterized as having a two dimensional spatial frequency.

The term "spatial frequency response" is used herein to quantify the ability of a given optical system to resolve detail in a scene when projecting an image of the scene onto the surface of a pixel array. As an example, a given optical system may have a high spatial frequency response for low spatial frequency scenes, such as a scene containing a low number of wide lines, which when projected onto a pixel array remain clear and distinct. The same optical system may have a low spatial frequency response for high spatial frequency scenes, such as a scene containing a high number of narrow lines, which when projected onto a pixel array may blur together. Spatial frequency response is typically measured, or computed, with respect to the image plane. The image plane, as stated above, is defined by the upper surface of the pixel array.

The term "modulation transfer function (MTF)" is used to quantify a function of the spatial frequency response of a given optical system for a given range of spatial frequencies. The MTF is further defined to be "monochromatic" when applied to optical systems imaging scenes that contain a single wavelength of light and to be "polychromatic" when applied to optical systems imaging scenes that contain a plurality of wavelengths of light, in which case analysis is performed by considering the entire spectral band imaged by the optical system. The scale of the vertical axis of the MTF plots for the examples given herein is unity at the spatial frequency of zero on the horizontal axis.

The term "spatial frequency cutoff" refers to the lowest spatial frequency at which the spatial frequency response is first less than, or equal to, a desired threshold. Generally, except where defined otherwise herein, the threshold will be $e^{-1}$.

The term "absolute spatial frequency cutoff" refers to the lowest spatial frequency at which the spatial frequency response is first is equal to zero.

Generally, the term "Nyquist frequency limit" refers to the maximum spatial frequency that can be sampled without error by a given pixel array, measured herein in cycles/millimeter (cycles/mm). In the general case, the Nyquist frequency limit of a given pixel array is equal to $1/(2d)$, where d is the center-to-center distance between adjacent pixels. However, there are specific instances described herein where the Nyquist frequency limit is redefined for a specific pixel array. The center-to-center distance between adjacent pixels is commonly referred to as the "pixel pitch."

When the spatial frequency response of the optical system exceeds the Nyquist frequency limit of the pixel array, the resulting digitized image is not likely to accurately depict the actual scene. Therefore, the preferred optical systems in accordance with the present invention has a spatial frequency response that is less than, or equal to, the Nyquist frequency limit of the associated pixel array.

As mentioned above, and as described in detail herein, objects within the digitized image are categorized and provide the basis for automatic vehicle exterior light control. The optical systems in accordance with the present invention may perform functions in addition to automatic vehicle exterior lighting control such as rain sensing, adaptive cruise control, lane departure warning, general artificial vision functions, etc. Therefore, the chosen optical system configuration will be dependent, at least in part, upon the given application.

Figure 3:
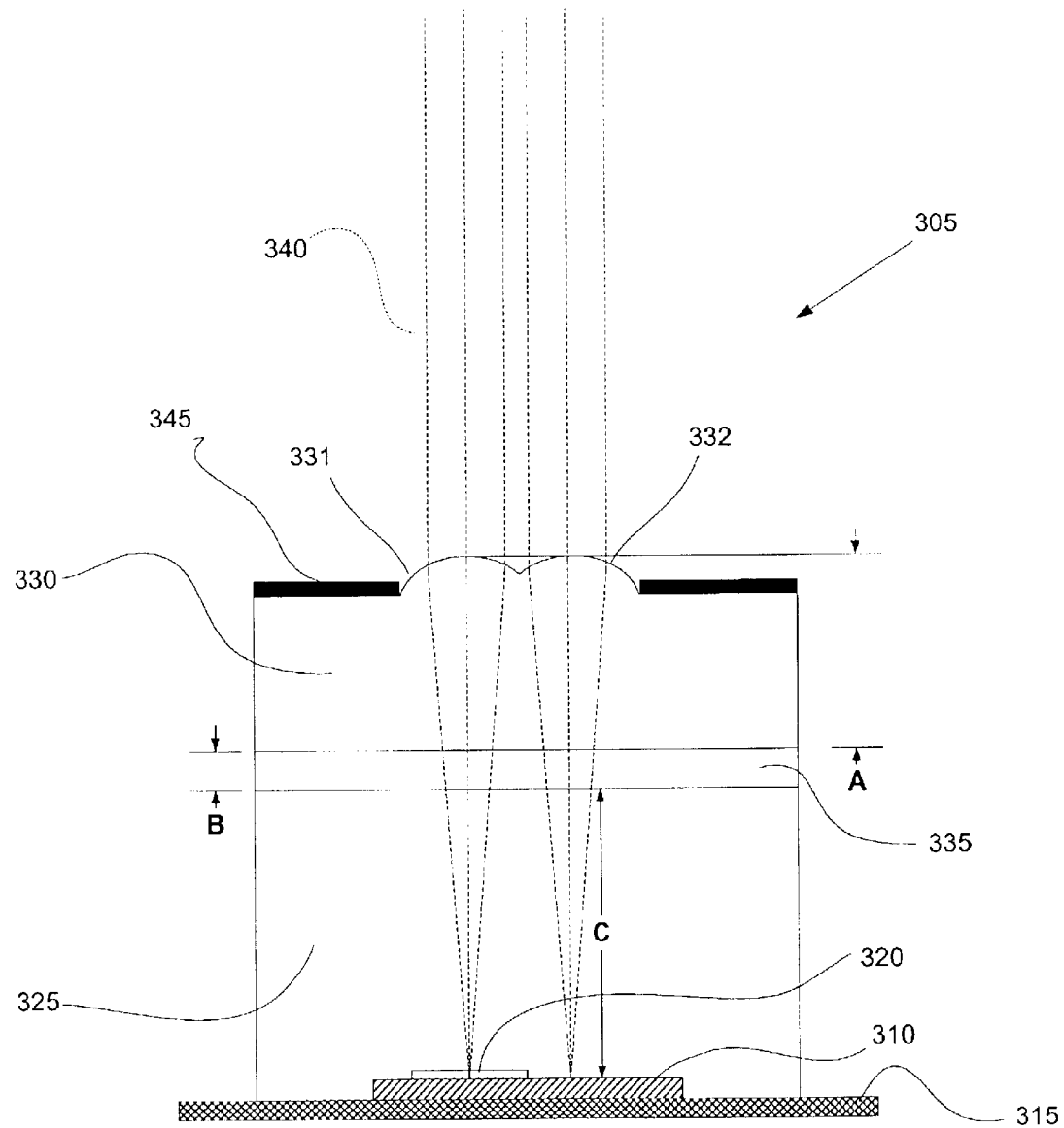
FIG. 3 depicts a preferred embodiment of the optical system in accordance with the present invention.

Turning now to FIG. 3, a preferred embodiment of the present invention is shown as optical system 305. A pixel array 310 is mounted onto a printed circuit board 315 with a die attach adhesive (not shown) and electrically connected with wire bonds (not shown). While the present invention is not limited to any number of pixels, size of pixels, type of pixels, or arrangement of pixels, it is advantageous to use a reasonably low number of pixels to minimize associated data processing, data transmission and data storage requirements. Lens system assembly 330 contains a first lens system 331 and a second lens system 332; each lens system projects light rays 340 onto the pixel array 310 such that two individual images of the scene forward of the controlled vehicle are formed on separate halves of the pixel array. Lens system assembly 330 is preferably formed of molded polycarbonate to withstand the potential high temperatures possible when the optical system 305 is mounted in the region of a vehicle rear view mirror. An encapsulate block 325 is preferably formed by transfer molding a clear epoxy, such as type NT-300H available from Nitto Denko, Shimohozumi, Ibaraki, Osaka, Japan, over the pixel array 310 and onto the printed circuit board 315 such that the encapsulate block is attached to the printed circuit board. Commonly assigned U.S. Pat. No. 6,130,421, to Stam et. al., which is incorporated herein in its entirety by reference, describes other structure that is contemplated for use with the present invention.

An aperture stop 345 prevents light rays from entering the optical system 305 other than through the two lenses' optical surfaces. A far-field baffle (not shown) excludes light rays from objects beyond the desired field of view from being projected onto the pixel array.

Lens system assembly 330 is preferably attached to the encapsulate block 325 by UV curable adhesive 335, which may be of type Norland-68 available from Norland Products, Cranbury, N.J. Preferably, proper alignment and focus of the lens system assembly is achieved by operating the optical system 305 with the lens system assembly placed over the encapsulate block with uncured adhesive 335 therebetween. The position of the lens system assembly 330 is adjusted, as described in detail below with regard to the preferred method of manufacture, until an image of an associated target is of the desired resolution. At this point, UV light is introduced to cure the adhesive and fix the lens system assembly in place relative the pixel array. The preferred manufacturing methods in accordance with the present invention are described in detail below. Alternatively, the two lens surfaces may be formed integral with the encapsulate block 325 as described below with respect to an alternative manufacturing method.

Figure 15:
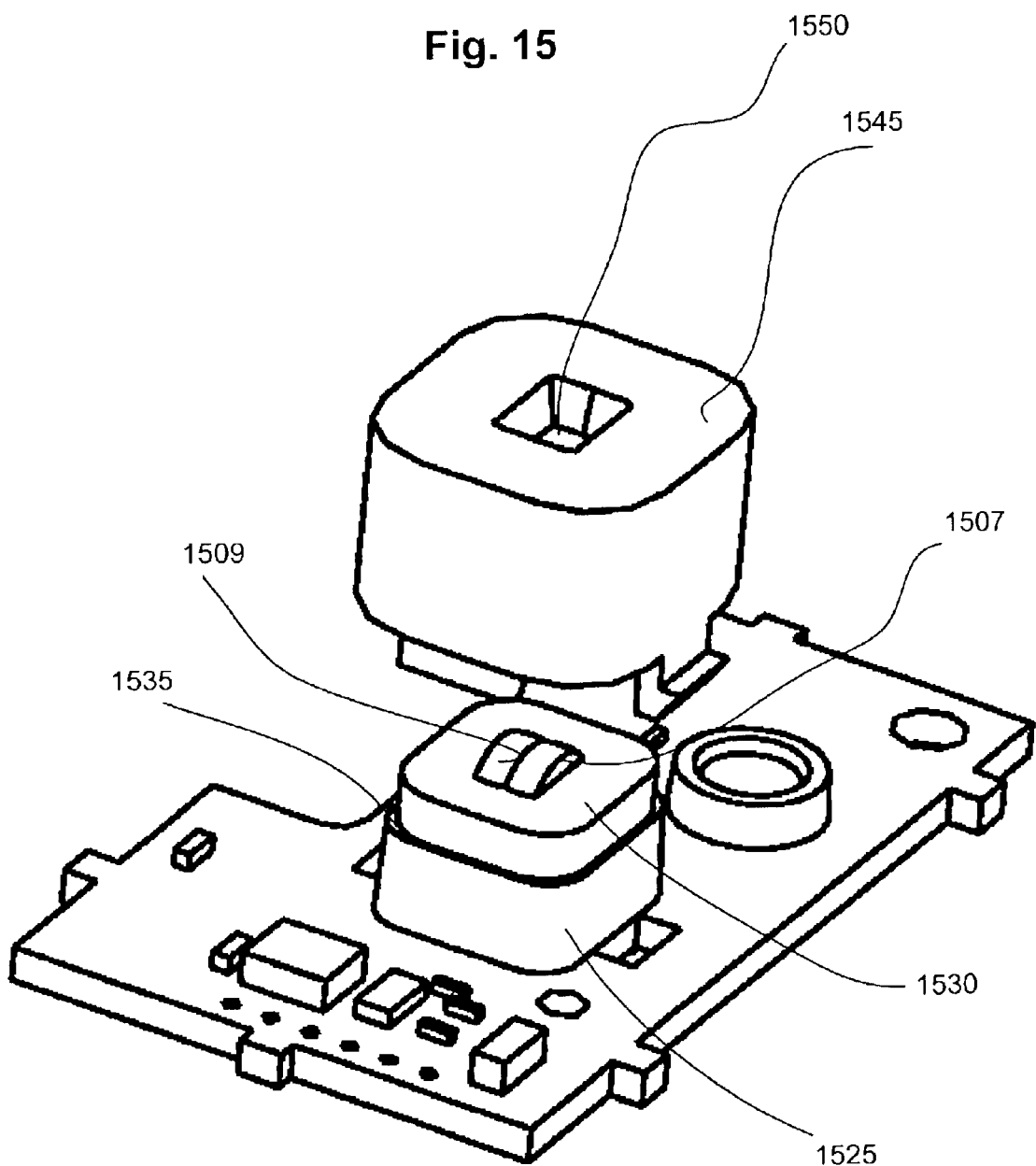
FIG. 15 depicts a perspective view of an optical system in accordance with the present invention having a dual lens system assembly with symmetrically truncated individual lens systems.
Figure 16:
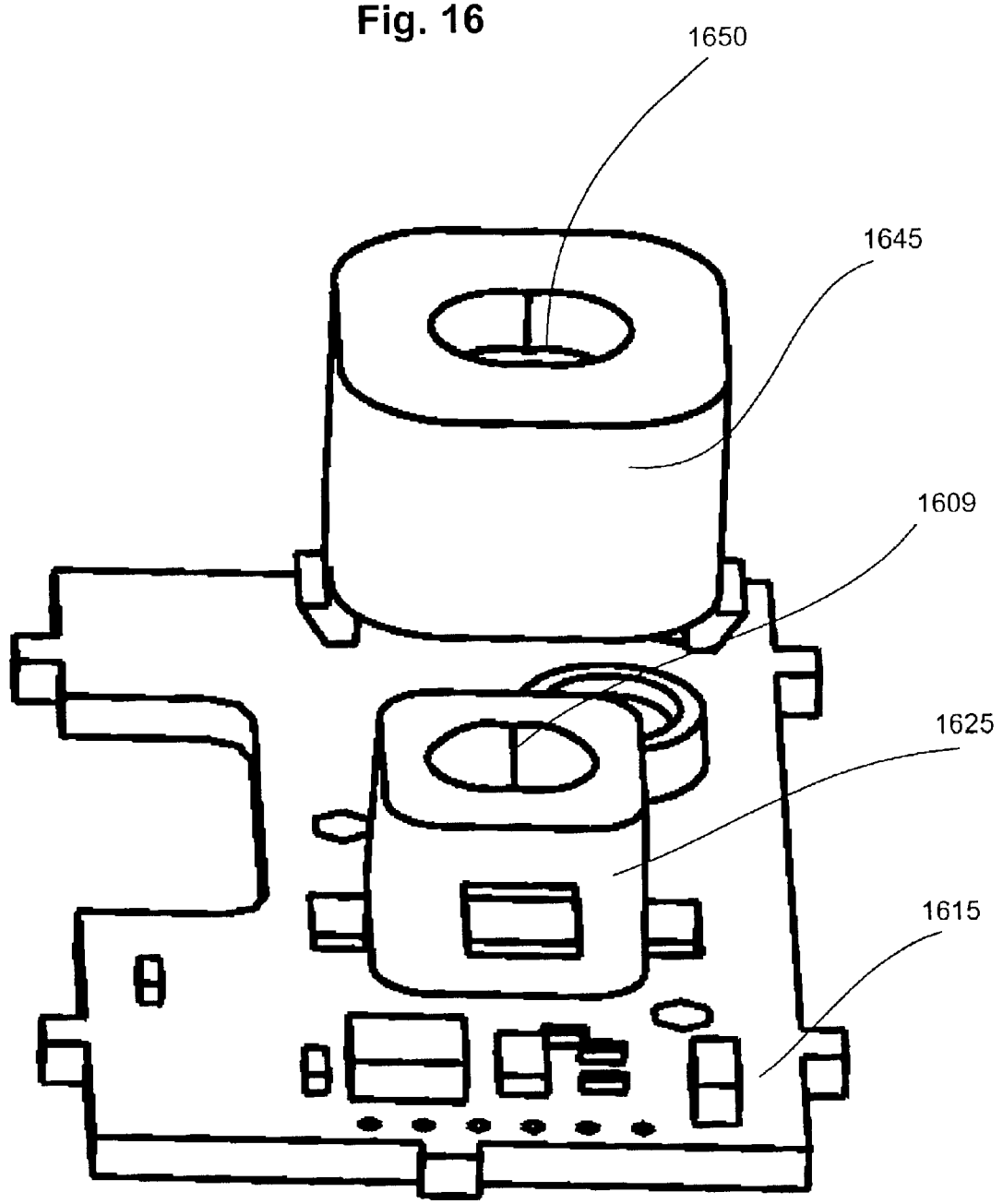
FIG. 16 depicts a perspective view of an optical system in accordance with the present invention having a dual lens system assembly with asymmetrically truncated individual lens systems.

Preferably, the centers of the first and second lens systems 331, 332 of the optical system 305, as shown in FIG. 3, are spaced closer than the diameter of the individual lens systems resulting in some truncation of each lens system. Truncation on only the adjoining edges, as shown in FIGS. 3 and 16, may cause a lack of symmetry that, in turn, causes non-uniformity in the aberrations associated with the overall optical system. This non-uniformity may be problematic for off axis imaging where a brightness comparison is made between an object projected by the individual lens systems. To ameliorate aberrations caused by non-symmetry, each lens system may be truncated at the outside edge as well as the adjoining edge. FIG. 15 depicts a symmetrically truncated lens system as part of an optical system in accordance with the present invention.

Returning to FIG. 3, preferably, red spectral filter material 320 is deposited over one half of the pixel array 310. The red spectral filter material 320 is preferably chosen to withstand the high radiant loading that may occasionally occur when the optical system 305 is aimed directly at the sun. When the optical system is aimed directly at the sun, the light rays of the sun are projected onto the spectral filter material 320 and the pixel array 310. Many known spectral filter materials contain light absorbing dyes that are likely to degrade under these conditions. To overcome the filter material degradation problem, spectral filter material 320 is preferably chosen to contain a pigment rather than a dye. Pigments are typically inorganic and can be made to be much more resistant to high radiant loading than dyes. Spectral filter materials containing pigments and which are suitable for patterning onto pixel arrays are available from Brewer Science, Inc. of Rolla, Mo.; spectral filter material of type PSCRed-101 is preferred. As an alternative to the use of a pigmented spectral filter material, multi-layer, thin-film, interference filters may also be used. A process for depositing interference filters for use on pixel arrays is described in U.S. Pat. No. 5,711,889, to Buchsbaum, the disclosure of which is incorporated in its entirety herein by reference.

To further protect the optical system, a photochromic, or electrochromic, spectral filter (not shown) is preferably placed in front of the optical system 305, this is especially preferred if less stable filter materials are used. Photochromic spectral material darkens when subject to high levels of light. Therefore, during sunny days, the photochromic spectral filter materials will darken and thus attenuate much of the light that could potentially damage the optical system. During the evening, when the automatic exterior light control feature is desired, the photochromic spectral filter material would be clear. Electrochromic spectral filters provide the same benefits as photochromic spectral filters, however, electrochromic spectral filters require external apparatus to control the associated darkening. Photochromic and electrochromic spectral filters are envisioned for use with the present invention.

Preferably, an infrared blocking spectral filter material (not shown) is positioned in front of the optical system, or elsewhere within the optical system, to prevent light rays of wavelengths greater than about 680 nm from being projected onto the pixel array. Optionally, the parameters of each lens system may be further optimized utilizing additional spectral filter material for the particular spectral bands imaged by the given optical system. It is foreseeable that the vehicle containing the optical system of the present invention will be parked for extended periods of time with the sun being directly incident upon the optical system, therefore, it is beneficial to provide spectral filtering material that blocks the harmful rays of the sun from entering the optical system. Similarly, any light rays that do not contribute to the ability of the optical system to function as desired should be inhibited from entering the optical system.

The spatial frequency response of a pixel array is limited to its Nyquist frequency limit. The Nyquist frequency limit is equal to $1/(2d)$, where d is the pixel pitch. In the general case, the pixel pitch is measured from the center of one pixel to the center of the adjacent pixel. In the case where pixels are not square, the maximum horizontal and vertical spatial frequency may be different and the Nyquist frequency limit should be considered with regard to the largest dimension.

When considering the Nyquist frequency limit of a pixel array with a patterned color spectral filter material array, the pixel pitch should be considered as the distance from the center of one pixel of a particular color to the center of the closest pixel of that same color. In the case of the Bayer pattern of FIG. 11a, any pixel of a particular color is two pixels away from another pixel of that same color; an exception is the case of the green filtered pixels that are located diagonal to each other, in which case, the blue and red pixels should be considered with regard to the pixel array Nyquist frequency limit.

When the spatial frequency response of the optical system is reduced, distant light sources tend to blur together in the image. This blurring may be disadvantageous when trying to discriminate two objects from one another. For example, a taillight and an overhead streetlight may blur into one object. To avoid this, it may be necessary to compromise the accuracy of the digital sampling in order to discriminate distinct objects from one another. The strict Nyquist frequency limit criteria implies that the spatial frequency cutoff of the optical system be less than, or equal to, $1/(2d)$, where d is the pixel pitch. The Nyquist frequency limit criteria may be violated for the purpose of increased discrimination without completely impairing the optical system functionality and without deviating from the spirit of the present invention.

From the plots depicted in FIGS. 4, 7, 36 and 37, it can be seen that the modulation transfer function (MTF) is significantly reduced at higher frequencies near the cutoff. Since the majority of vehicular light sources are broadband emitters, the polychromatic MTF over the spectral bandwidth used may be considered. Optical systems wherein the polychromatic MTF first drops to $e^{-1}$ at a spatial frequency that is less than, or equal to, the reciprocal of the pixel pitch are in accordance with the present invention.

Figure 14:
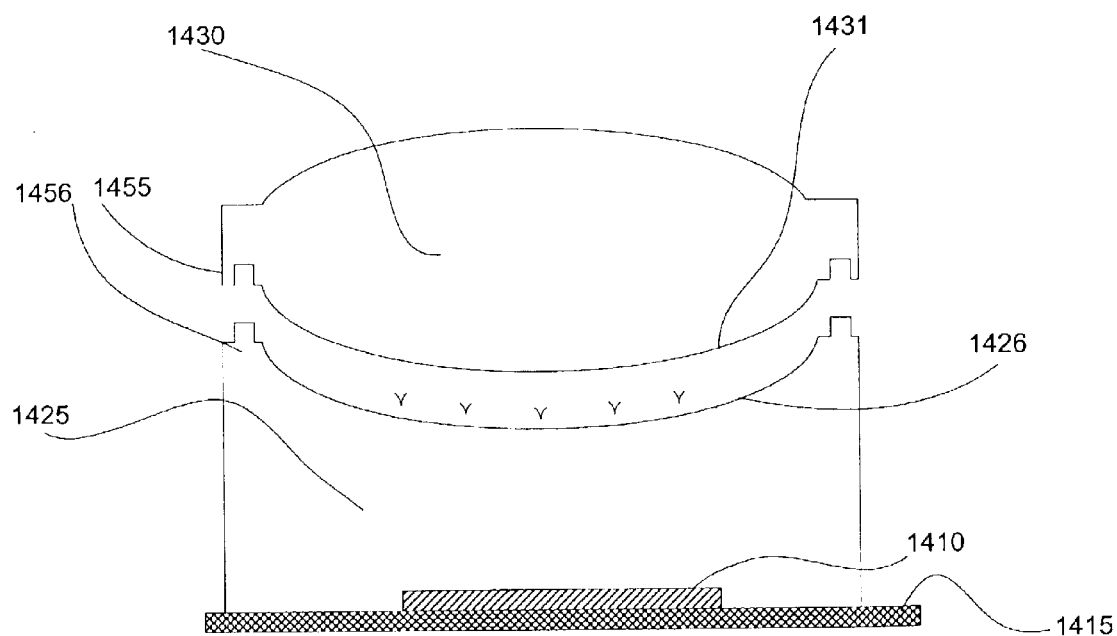
FIG. 14 depicts an alternate embodiment of a lens system for use with the optical system in accordance with the present invention which provides for chromatic aberration correction.

The strict Nyquist frequency limit may be violated and acceptable performance still achieved. Optical systems in accordance with the present invention are capable of imaging light rays of all visible wavelengths, thus reducing the spatial frequency response of the optical system for polychromatic sources. Better polychromatic spatial frequency response may be achieved through the use of an achromatic lens system as depicted in FIG. 14. Optical systems wherein the polychromatic MTF first drops to $e^{-1}$ at a spatial frequency less than, or equal, to the reciprocal of the minimum distance between any two pixels containing the same color spectral filter, for a spectral band imaged by the optical system, are also in accordance with the present invention.

The following examples are intended as representations of the present invention for illustrative purposes and in no way should be interpreted as limiting the scope of the present invention. As will be appreciated by the skilled artisan, the present invention can embody a host of optical system characteristics to satisfy particular operational desires.

EXAMPLE 1a

The optical system of this example is constructed as depicted and described with regard to FIG. 3 and results in a sharply focused optical system. The pixel array is a complementary metal-oxide silicon (CMOS) active pixel array comprising a 64 pixels horizontal ×80 pixels vertical array of 30 µm, photogate, pixels. The thickness of the encapsulate block (dimension C as shown in FIG. 3), measured from the top surface of the pixel array to the top surface of the encapsulate block, is 3.75 mm. Each lens system has a diameter of 4.4 mm, a radius of curvature of 2.6 mm and a conic constant of −0.4. The thickness of the lens system assembly (dimension A in FIG. 3) is 3.0 mm. The centers of the individual lens systems are spaced by 1.44 mm; each lens system is truncated on one side to place the center-to-center distance of the lens systems at the desired distance to form the lens system assembly. Sub windows of 60 pixels horizontally×26 pixels vertically are chosen for image acquisition in each half of the pixel array providing a field of view of approximately 24° horizontal by 10° vertical, or approximately 0.4° per pixel. A first analysis is performed on the optical system with the lens system assembly positioned such that sharpest focus is achieved. This occurs when the UV cured adhesive is 0.26 mm thick.

Figure 4:
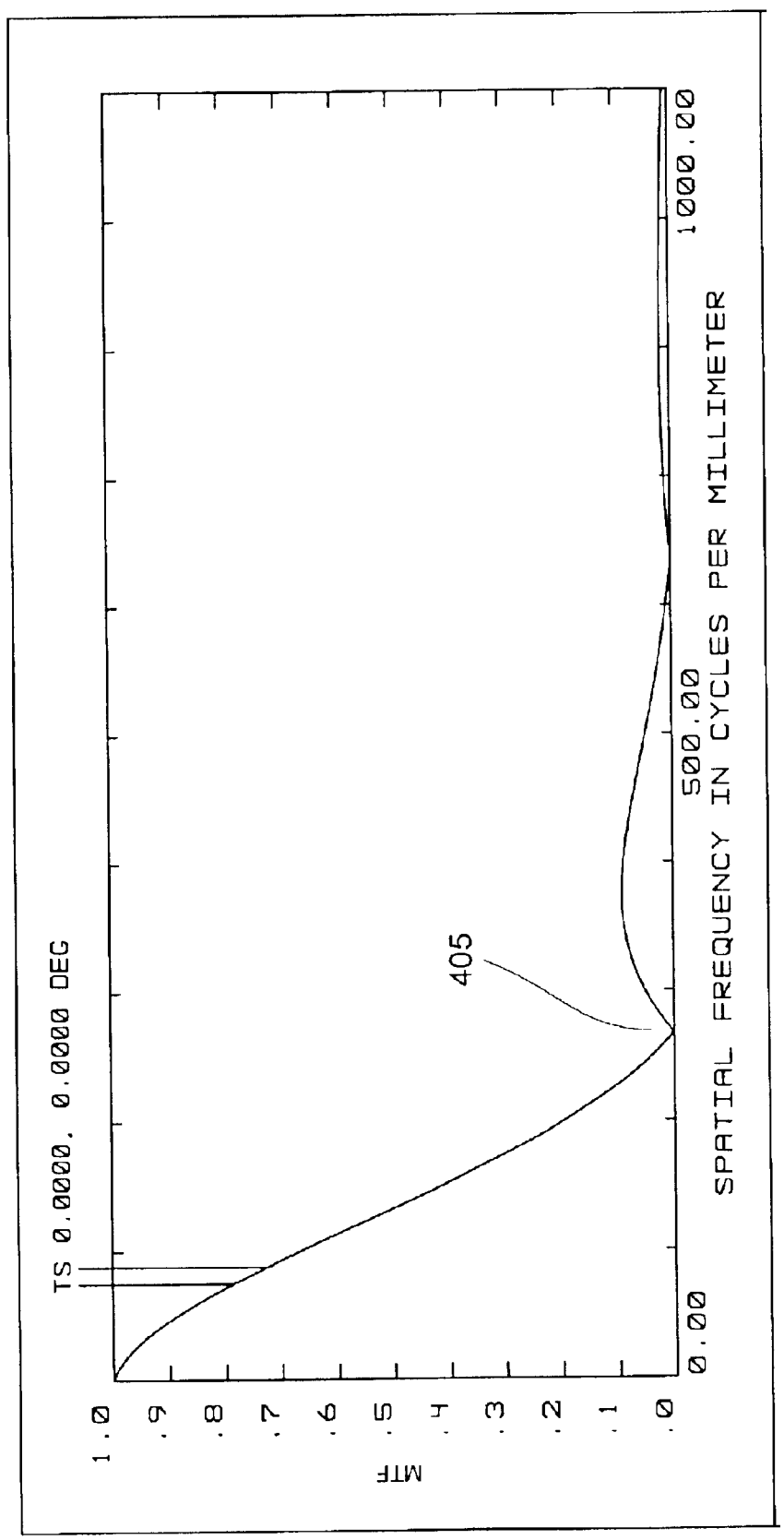
FIG. 4 depicts the modulation transfer function plot of the "sharply focused" optical system of a known optical system as described in example 1a herein.

FIG. 4 depicts the Modulation Transfer Function (MTF) plot of the optical system of this example. Zemax lens design software, as discussed in detail below, was utilized to analyze the optical systems described herein and to generate the corresponding MTF plots. Although, the actual optical systems of examples 1a and 1b comprise truncated lens systems, the analysis was approximated with data representative of non-truncated lens systems. An MTF plot shows the spatial frequency response of an optical system and thus describes the ability of a lens system to project objects as a function of the resolution of an imaged scene. The results of the optical system of this example has an absolute spatial frequency cutoff of approximately 260 cycles/mm, shown at reference 405 in FIG. 4, when imaging on axis at the single wavelength of 620 nm. With 30 μm pixels, the Nyquist frequency limit of the pixel array is 16.67 cycles/mm.

The spatial frequency response of the optical system greatly exceeds the sampling capability of the pixel array, resulting in the potential for significant error in digital representation of the imaged scene. The degree of error is less when considering the application of imaging actual taillights. For this purpose, distant taillights are typically located within 1° of the optical axis, therefore, the on-axis MTF should be considered. However, a typical taillight is a broadband emitter of light of a wide range of wavelengths and a multi-wavelength MTF can be considered. Combination of a red spectral filter material and an infrared spectral filter material provides a spectral band of about 600–680 nm for imaging of taillights that reduces the spatial frequency response of the lens system assembly somewhat.

Figure 5:
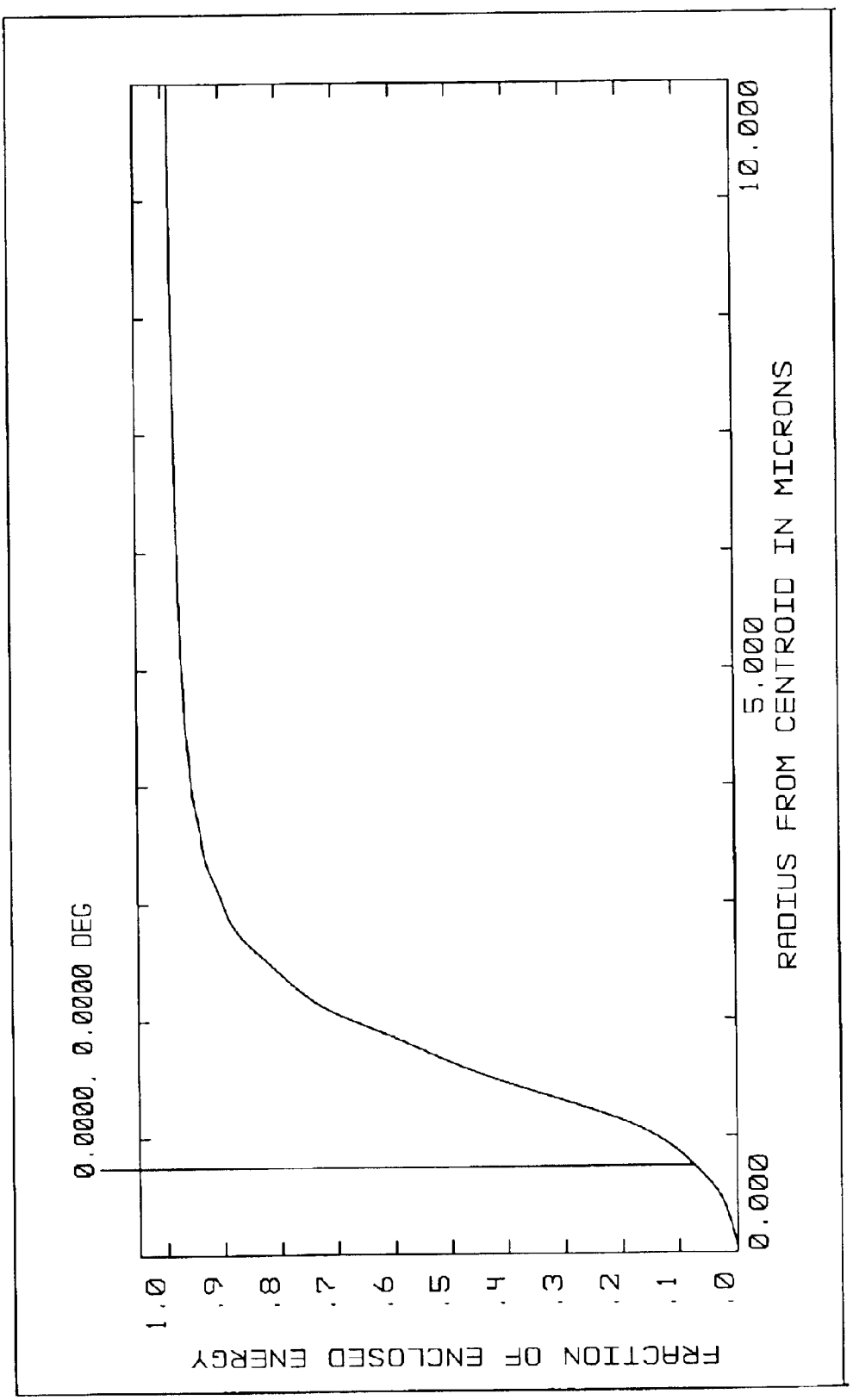
FIG. 5 is an encircled energy plot that shows the integral of total energy of a projected spot as a function of the distance from the center of the spot.
Figure 6:
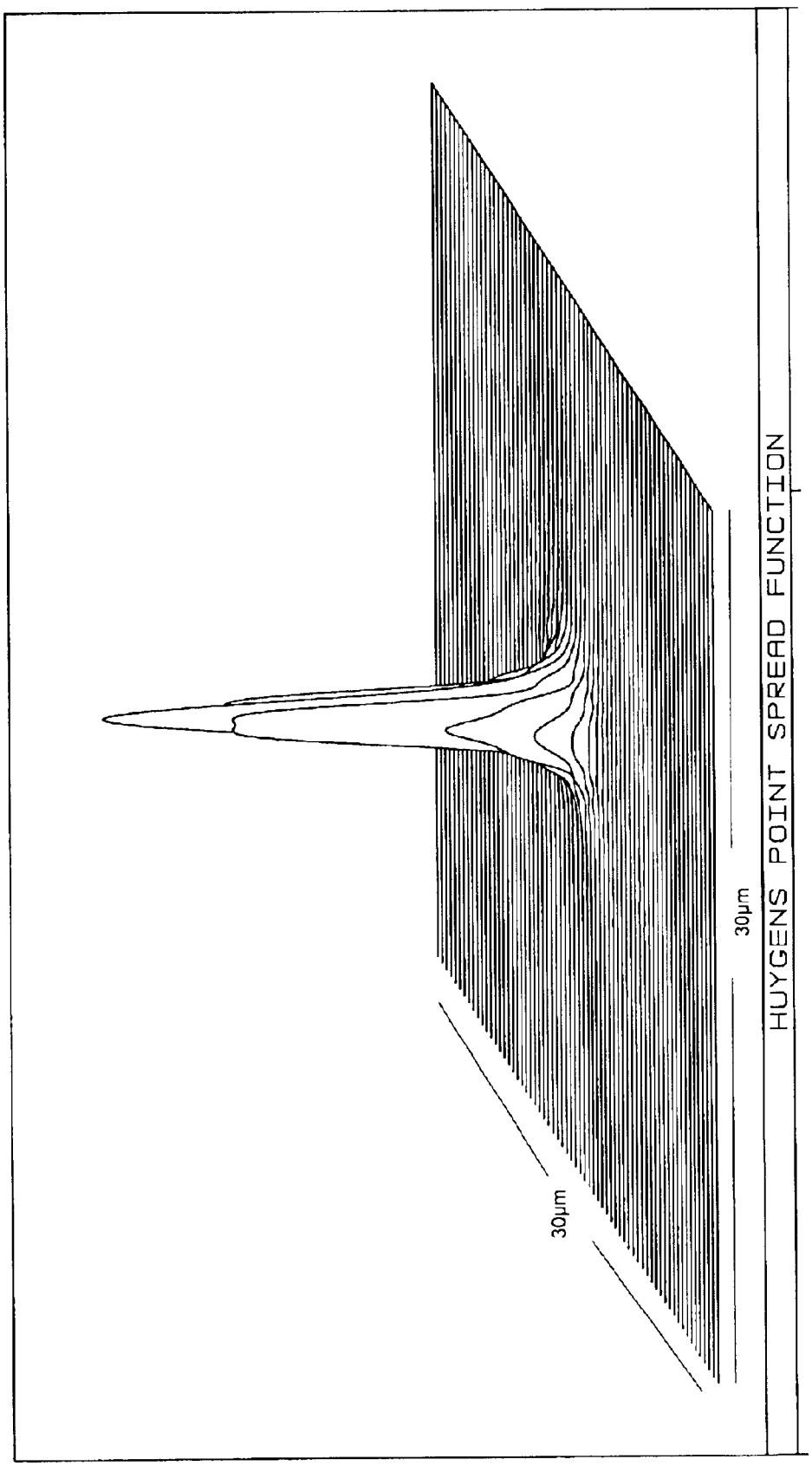
FIG. 6 depicts a point-spread-function plot of a monochromatic projected spot for the optical system as described in example 1a herein.

The above analysis is further clarified with reference to FIG. 5. FIG. 5 depicts an encircled energy plot for the optical system of this example that shows the integral of total energy of an imaged spot as a function of the distance from the center of the spot. As shown, for on-axis imaging of light of wavelength 620 nm, 90% of the total energy is contained in a spot of radius 3.0 μm. This spot is significantly smaller than the pixel size of 30 μm and may lead to the errors previously described. As described above, the magnitude of this problem is reduced when considering multi-wavelength imaging. However, narrow band light sources, such as LED taillights, must be considered when designing an optical system for automatic vehicle exterior light control. For a final illustration of the optical system of this example, FIG. 6 depicts a point-spread-function plot of a monochromatic spot. By viewing FIG. 6, it is possible to see the amplitude of the imaged spot relative to an area of the size of a pixel.

EXAMPLE 1b

Figure 7:
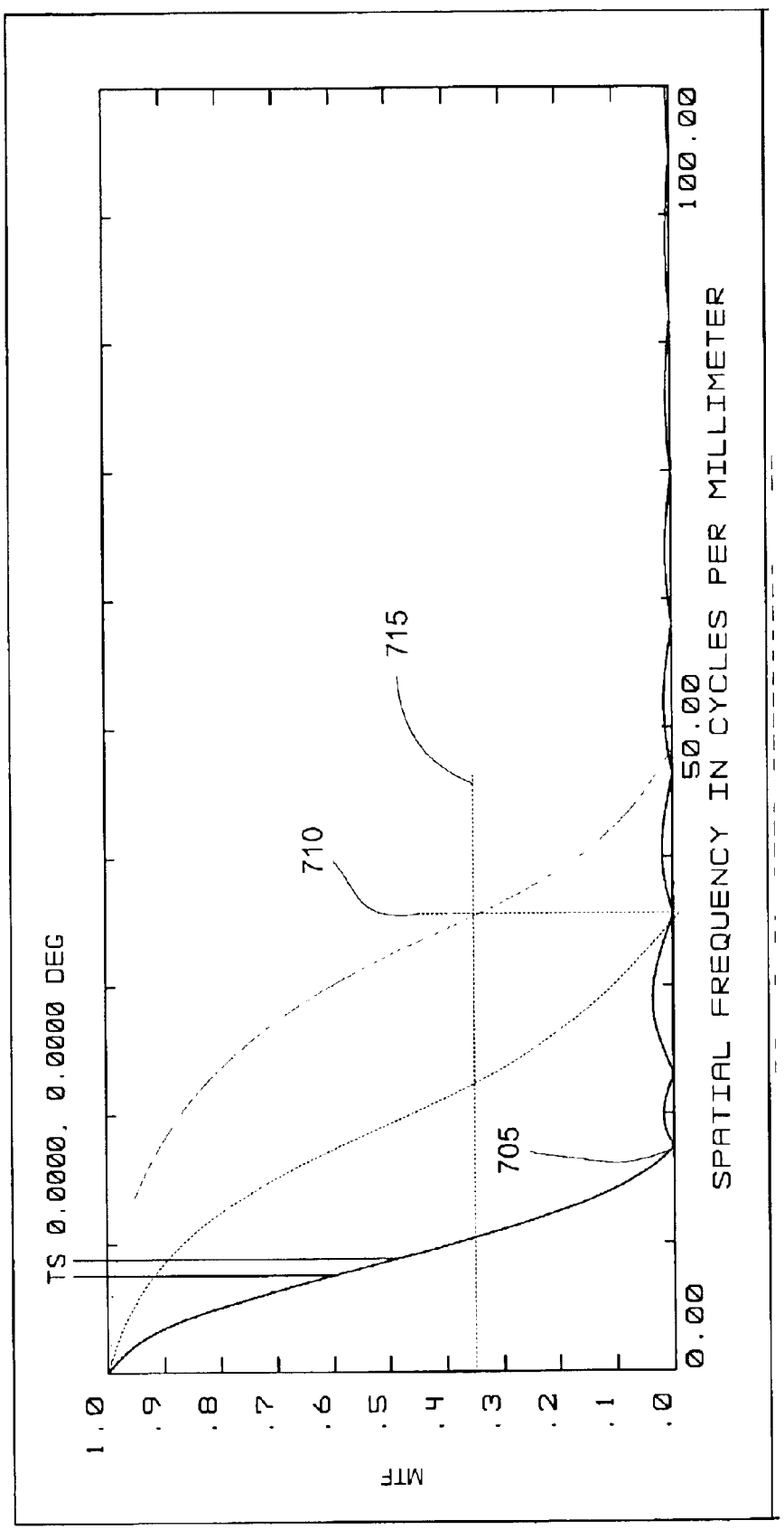
FIG. 7 depicts a modulation transfer function plot of the optical system of example 1b in accordance with the present invention.

In order to achieve accurate digital sampling of the imaged scene in accordance with the present invention, the optical system of Example 1a should be modified to have a spatial frequency cutoff that is less than, or equal to, the Nyquist frequency limit of the pixel array. This is achieved in accordance with the present invention by modifying the thickness of the encapsulate block to produce a more "blurred" image with a lower spatial frequency cutoff. FIG. 7 depicts the MTF plot of the optical system described in Example 1a modified with the thickness of the encapsulate block (dimension C as shown in FIG. 3) reduced to 3.65 mm. This reduction in block height limits the absolute spatial frequency cutoff of the optical system to approximately 17 cycles/mm, shown at reference 705 in FIG. 7, roughly the same as the limit of the pixel array of 16.67 cycles/mm.

FIG. 7 also depicts plots of modulation transfer functions, in dashed and dotted lines, of alternated embodiments of optical systems in accordance with the present invention. As shown with regard to reference number 710, the MTF depicted with a dashed line represents an optical system with an absolute spatial frequency cutoff that is equal to the reciprocal of the pixel pitch of the optical system of examples 1a and 1b. As shown with regard to reference number 715, the MTF depicted with a dotted line represents and optical system with a modulation transfer function that first drops to $e^{-1}$ at a spatial frequency equal to the reciprocal of the pixel pitch of the optical system of examples 1a and 1b. As discussed above, optical systems that deviate from the strict Nyquist frequency limit criteria, such as those shown by the dashed and dotted lines in FIG. 7, will contain some sampling error. However, in an effort to improve discrimination between distant light sources that are in close proximity to one another, sacrificing a small amount of sampling accuracy may improve overall system performance.

Figure 8:
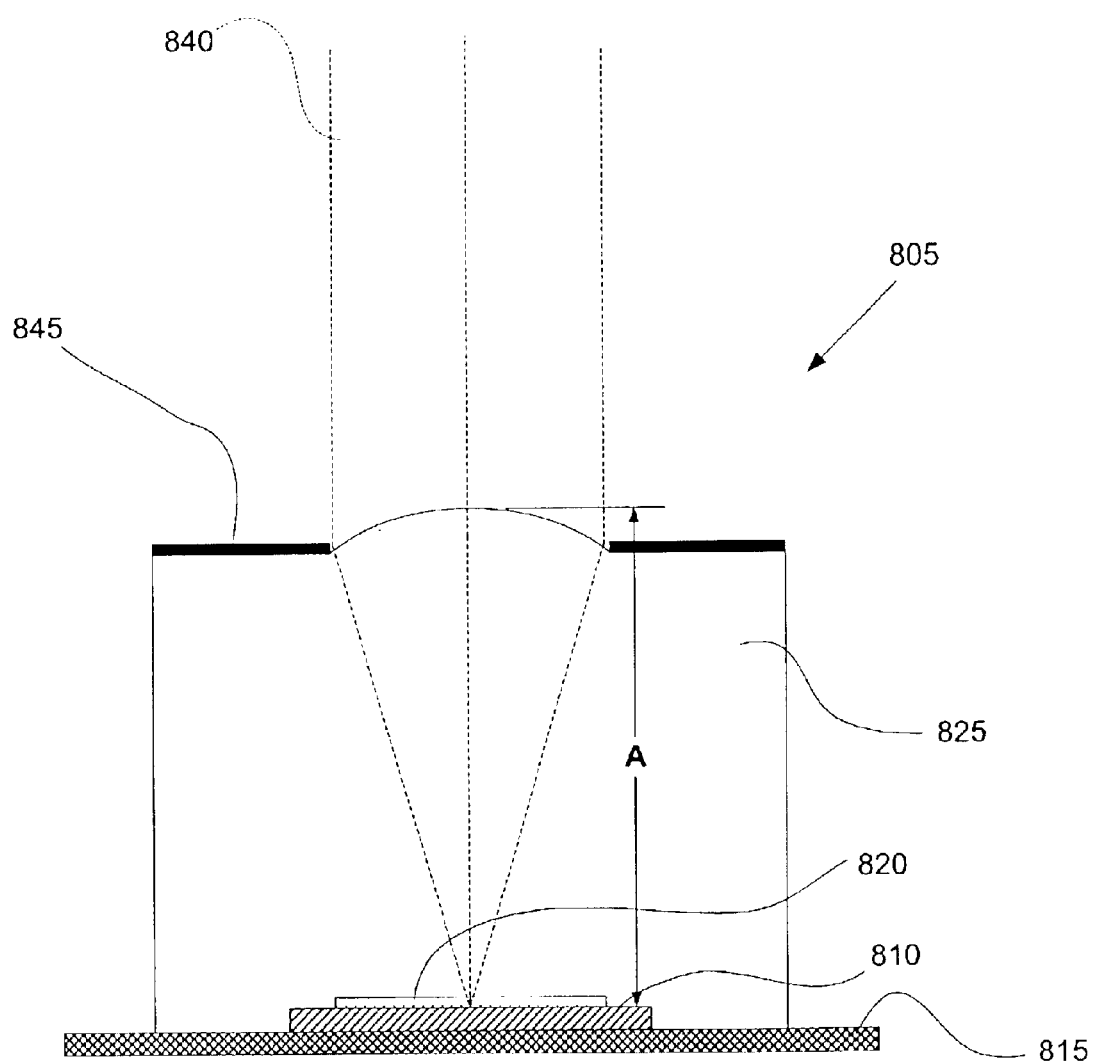
FIG. 8 depicts an alternative embodiment of the optical system in accordance with the present invention.
Figure 9:
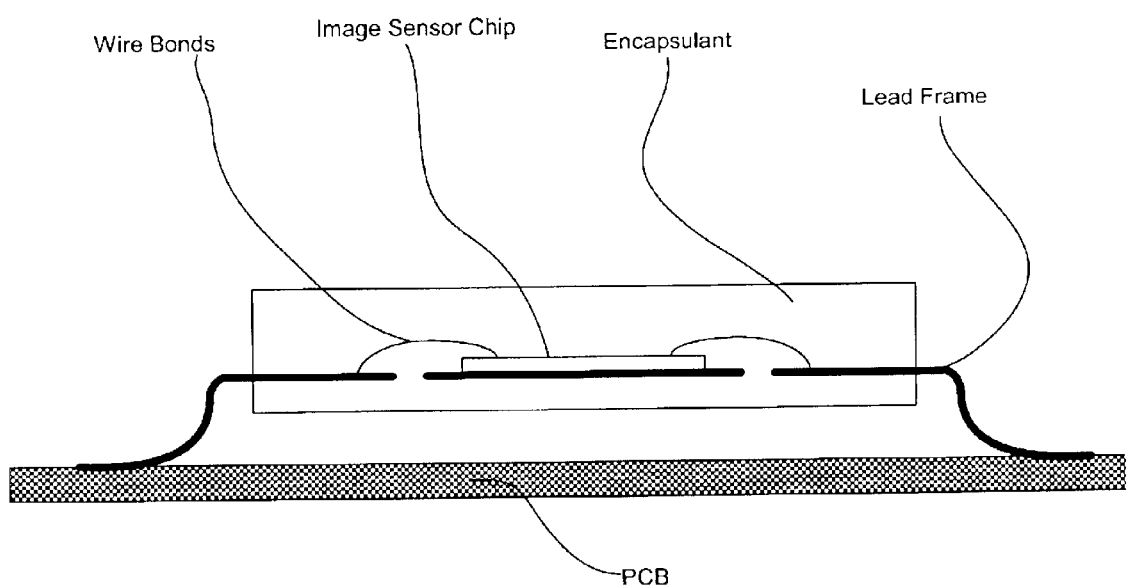
FIG. 9 depicts an encapsulated pixel array in accordance with the prior art with the lead frame extending to the exterior of the encapsulate block.

An alternate embodiment in accordance with the present invention is depicted in FIG. 8 as optical system 805. A single lens system 825 is shown which is precisely transfer molded directly over the pixel array 810 with no interposing encapsulate block. A separate lens system may also be used which may be directly attached to the pixel array or may be a separate component containing one, or more, lens surfaces. The lens system 825 projects light rays 840 onto the pixel array 810 which is preferably covered with a color spectral filter material array 820, most preferably as shown in either FIG. 11a or 11b. Aperture stop 845 blocks light rays 840 from entering the optical system 805 through paths other than the lens system. An infrared spectral filter (not shown) and, or, an ultra-violet spectral filter (not shown) may be used to block infrared and, or, ultra-violet radiation from entering the optical system. A far-field baffle (not shown) may be used to prevent objects beyond the desired field of view from being imaged by the optical system. The pixel array 810 is preferably mounted onto a printed circuit board 815 using chip-on-board mounting as known in the art. Other methods of constructing optical system 805 will be appreciated by those skilled in the art and are in accordance with the present invention. For example, the pixel array may be contained in a package and soldered onto the circuit board as shown in FIG. 9. The lens system may attach to a pixel array package or may attach to the printed circuit board through the use of a lens system mount.

Figure 10:
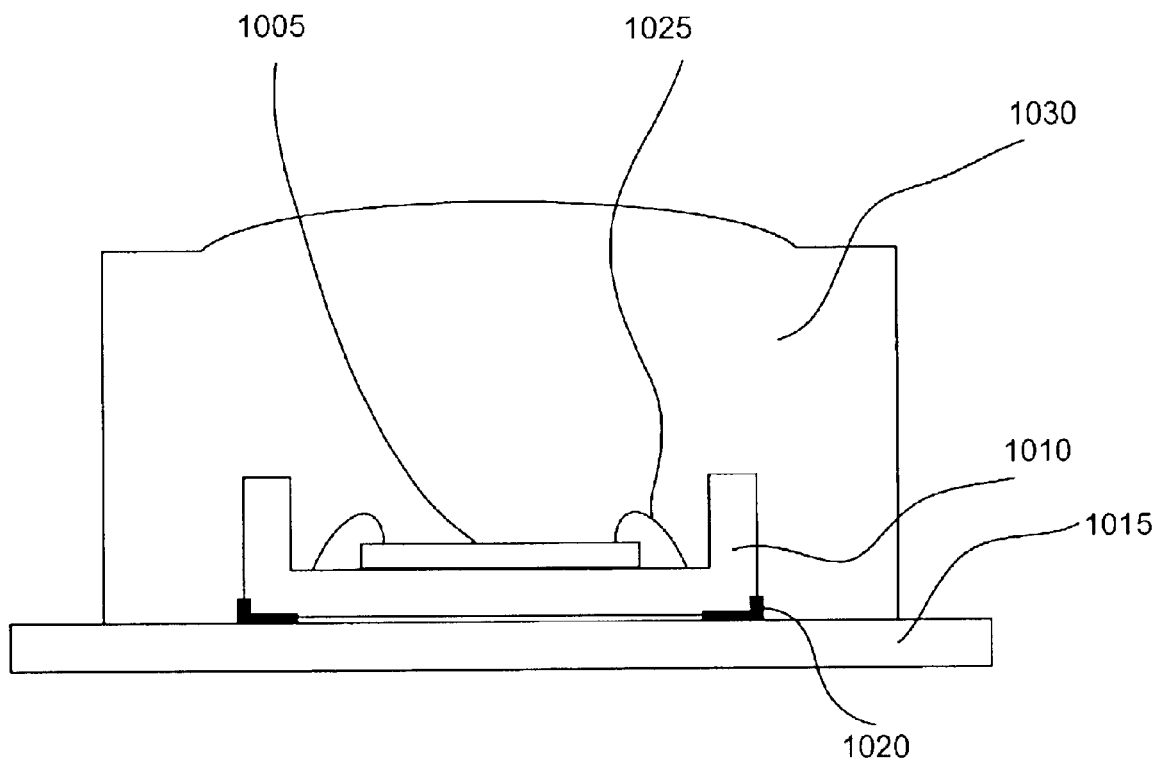
FIG. 10 depicts an alternate embodiment of the optical system in accordance with the present invention.

In this embodiment of the present invention, the lens system and the encapsulate block are preferably formed as a single transfer molded lens system 825. Molding of lens system 825 in this fashion is accomplished by providing a negative of the lens system features in a transfer mold tool. The pixel array 810 is precisely aligned and wire bonded (not shown) onto the printed circuit board 815. The entire lens system 825 (lens system and encapsulate block) is then transfer molded in one piece over the pixel array. Stresses in the encapsulate block along the edges of the pixel array 810 may be reduced by beveling the edges of the pixel array chip. This is accomplished by dicing the pixel array chips 810 from the associated silicon wafer using a beveled dicing blade. Alternatively, a packaged or chip-scale packaged pixel array, as depicted in FIG. 10, may be placed onto a circuit board and subsequently encapsulated by lens system 1030. The embodiment of the present invention as depicted in FIG. 10 has a pixel array 1005 attached to a carrier 1010 via wire bonds 1025. The carrier 1010 is preferably solder bonded 1020 to printed circuit board 1015. The lens system 1030 is precisely transfer molded over the packaged pixel array such that it attaches to circuit board 1015. The lens system transfer molding method in accordance with the present invention has the advantage of using fewer manufacturing steps and eliminating a separate lens system. However, this method requires all components to be very precisely aligned since subsequent adjustment of the lens system relative to the pixel array is not possible.

Figure 11A:
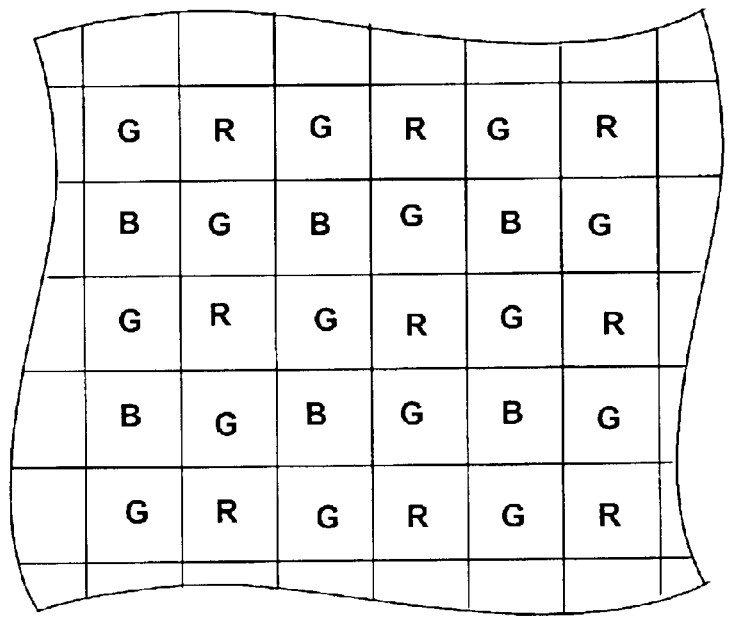
FIG. 11a depicts a pixel array with superimposed spectral filter material comprising a "Bayer pattern" in accordance with the present invention.
Figure 11B:
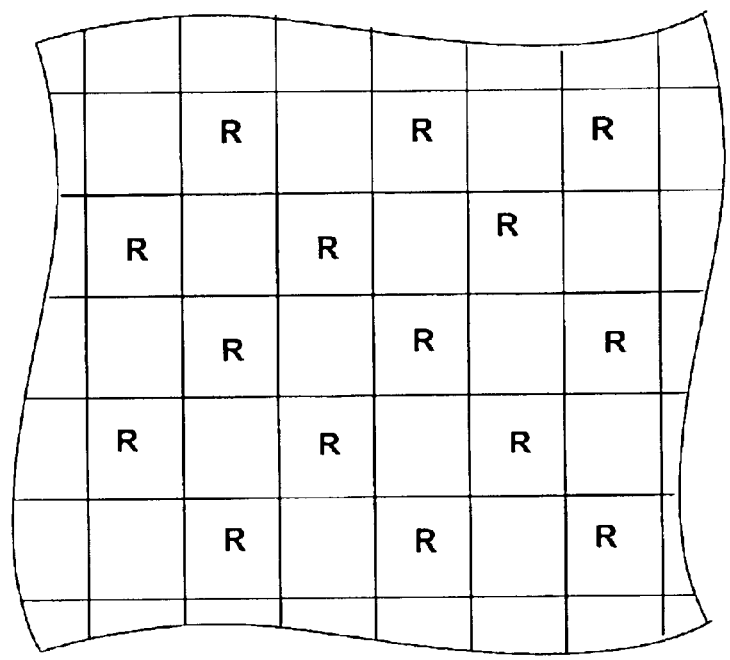
FIG. 11b depicts an alternative embodiment of a pixel array with superimposed spectral filter material in accordance with the present invention.

The optical system 805, of FIG. 8, incorporates a color spectral filter material that is patterned onto the pixel array, preferably, as shown in either FIG. 11a or 11b. FIG. 11a depicts a typical Red/Green/Blue (RGB) filter patterned over the pixel array in a checkerboard fashion (this pattern is commonly referred to as a "Bayer pattern"). For conventional optical systems, it is common to cover twice the number of pixels with a green filter as are covered by a red or blue filter, to mimic the human eye's higher sensitivity to green light. For the present invention it is advantageous to cover twice as many pixels by a red filter compared to the number of pixels covered by a blue or green filter in order to maximize detection of distant taillights. Actual color of the detected light source is determined by interpolation of neighboring pixels of different colors by techniques well known in the art. As an alternative to a checkerboard or mosaic pattern as depicted in FIGS. 11a and 11b, patterning spectral filters with stripes is in accordance with the present invention. The use of complementary Cyan/Yellow/Magenta filter arrays is also in accordance with the present invention. As previously discussed, use of a pigmented filter material is preferred because it provides much greater stability in high radiant loading conditions.

While use of a RGB spectral filter array provides a high level of color information, use of a red filter, alone, is in accordance with the present invention and is preferred because it reduces the computational requirements of the associated processing system. FIG. 11b depicts a checkerboard pattern using only a red specral filter on a portion of the pixels and no spectral filter on the remainder. A cyan, or complimentary, spectral filter may alternatively be used on the non-red spectral filtered pixels. A stripe pattern is also contemplated.

Figure 12:
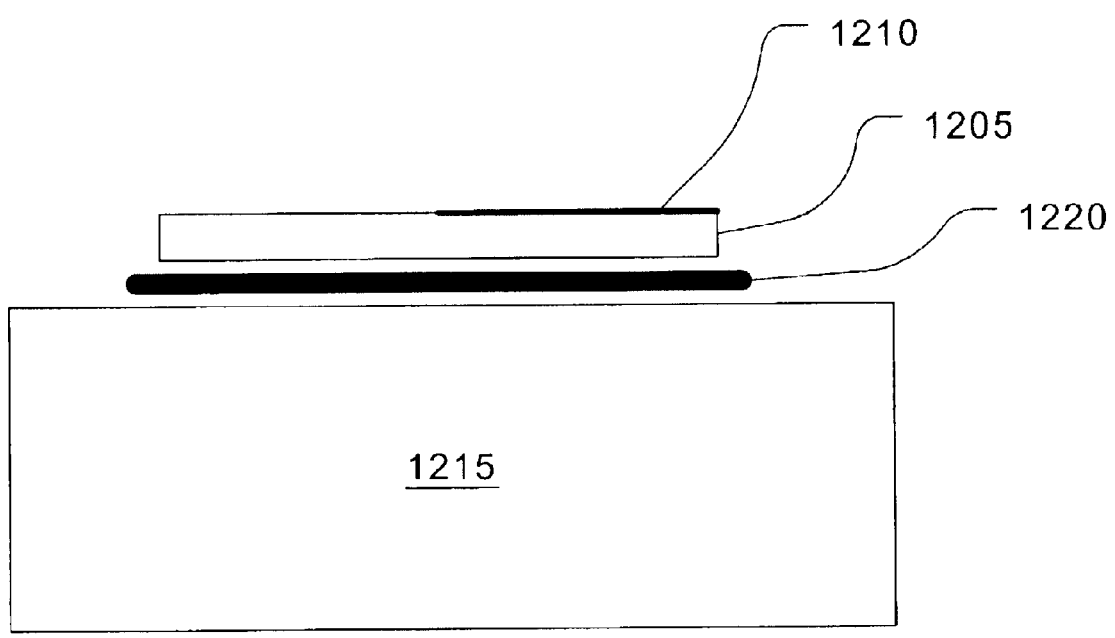
FIG. 12 depicts an alternative embodiment of a pixel array with a secondary substrate superimposed over the pixel array having a spectral filter material on the secondary substrate in accordance with the present invention.

In an alternate embodiment of the present invention, as shown in FIG. 12, a secondary substrate 1205, such as a piece of glass, with a controlled spectral filter material 1210 pattern, is directly attached to the surface of the pixel array 1215. Standard microelectronic assembly equipment as known in the art is used to place the spectral filtering substrate on the pixel array. A mechanical bond is created between the two components through the use of a UV cured optical grade epoxy 1220. By aligning the filter pattern formed on the secondary substrate 1205 in a predetermined position on the pixel array 1215 the filter-on-die solution, as described above, is closely duplicated. It is within the scope of the present invention to incorporate infrared and, or, ultra-violet spectral filter material into the optical system utilizing this method, in which case, substantially the entire secondary substrate would be coated.

Figure 13:
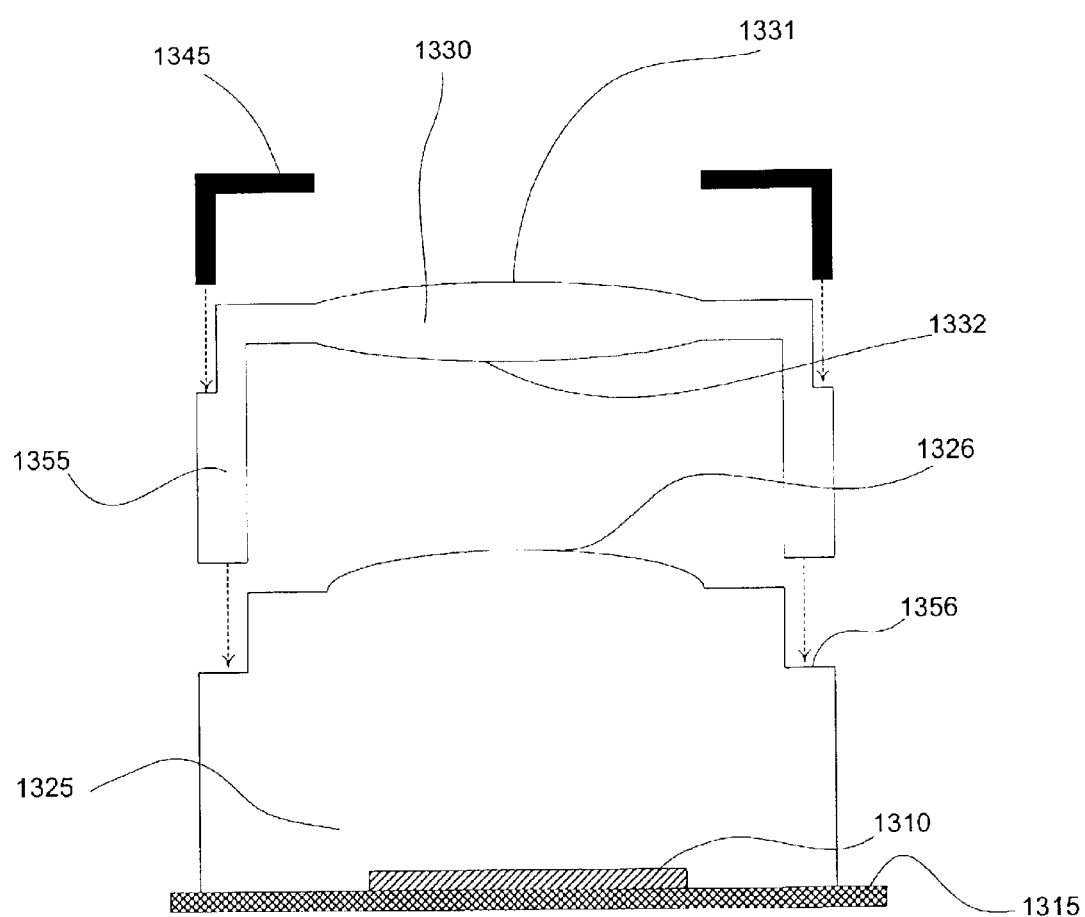
FIG. 13 depicts an alternate embodiment of a lens system for use with the optical system in accordance with the present invention that provides for high resolution.

For applications where higher resolution is desired, multiple lenses, each lens having associated optical surfaces, are commonly used. An embodiment facilitating simple manufacture of a multi-element lens system is shown in FIG. 13. A transfer molded encapsulate block 1325 is formed on PCB 1315 covering pixel array 1310. The transfer molded encapsulate block may be formed with an integral optical surface 1326. Registration features 1356 are provided in the transfer molded encapsulate block for proper registration of a second lens 1330. Registration features 1356 may be cutouts, pegs, posts, slots, grooves, snaps or any other feature that facilitates proper alignment of lens 1330 with encapsulate block 1325. Registration features 1356 may also serve to retain lens 1330 to encapsulate block 1325. An adhesive may also be used to retain lens 1330 to encapsulate block 1325. Finally, lens 1330 may be actively aligned and adhered to the encapsulate block by a positioning system described in detail below.

Lens 1330 contains mating features 1355 to align with registration features 1356. The lens 1330 has first and second optical surfaces 1331, 1332. These optical surfaces, along with optical surface 1326 may be any combination of optical surface types including concave, convex, flat, aspheric, spherical, refractive, diffractive, binary, or any other type of optical surface. Lens 1330 may be made of any suitable material and is preferably molded from a transparent plastic to facilitate incorporation of mating features 1355. The encapsulate block 1325, with optical surface 1326, and lens 1330, with optical surfaces 1331,1332, combine to form a lens system. An aperture stop 1345 may be provided which mates or snaps to registration features 1356 in lens 1330.

Figure 18:
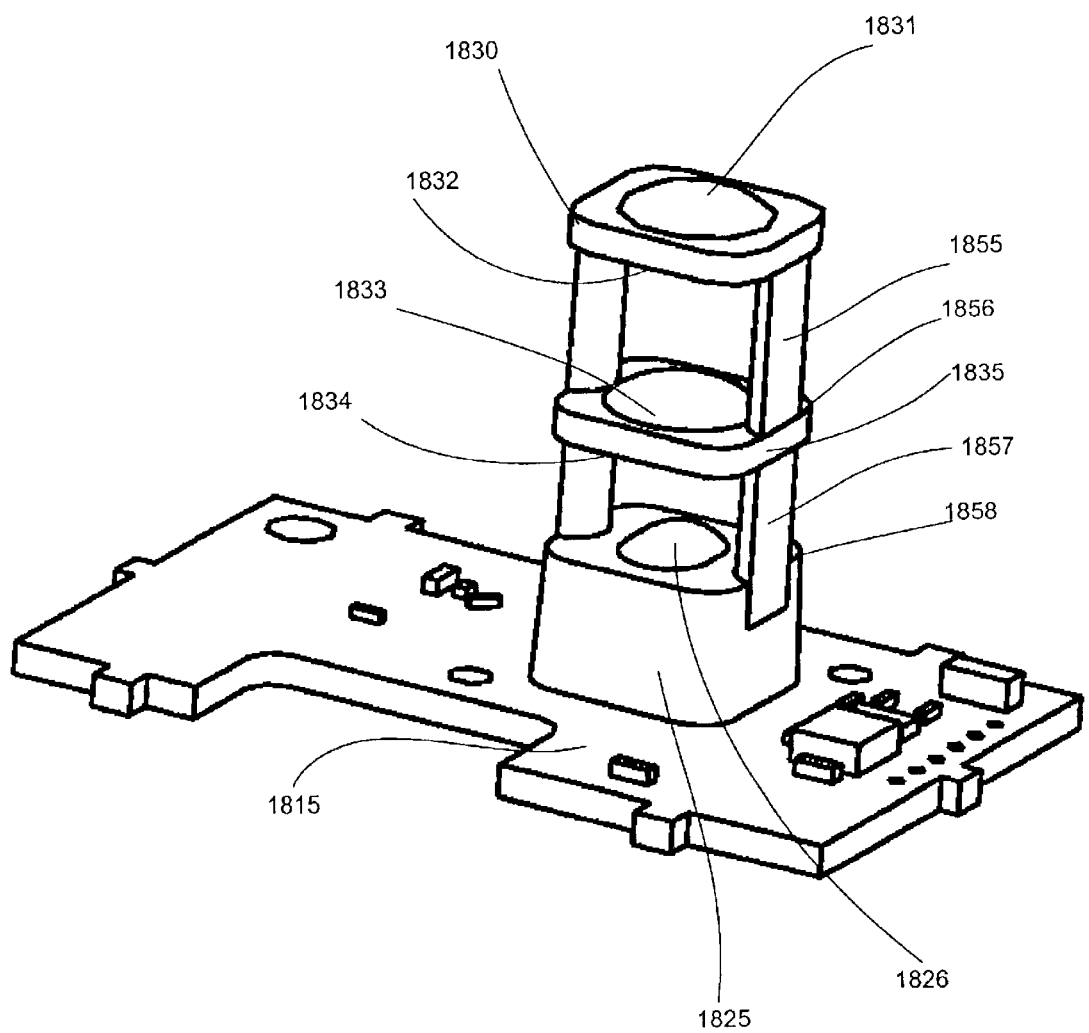
FIG. 18 depicts a perspective view of an optical system in accordance with the present invention having a cascaded lens system for high resolution applications.

Additional lens elements similar to lens 1330 may be further stacked on top of lens 1330 and mated with registration features to ensure proper alignment, as shown in FIG. 18. In this way, any number of lens elements with a variety of prescriptions along with stops, shutters, or other optical elements may be conveniently stacked to achieve the desired design. Other optical elements may be provided in the optical system which are not stacked from encapsulate block 1325 but rather secured by another means, for example to provide a movable lens element.

For some applications, use of an achromatic lens is desired. An achromatic lens corrects for, or reduces, chromatic aberration caused by the variance in index of refraction of an optical material with wavelength. An embodiment of the present invention useful for forming an achromatic lens is shown in FIG. 14. The encapsulate block 1425 is preferably formed from a material such as Nitto 300H available from Nitto Dengo, Shimohozumi, Ibaraki, Osaka, Japan, which has a relatively high, 1.57, index of refraction and functions similar to a flint glass. The lens 1430 is preferably formed from acrylic, or other lower index of refraction (n=1.49) material, that functions similar to a crown glass. The lens 1430 and encapsulate block 1425 have mating lens surfaces 1431,1426 which are preferably cemented together using a transparent adhesive. The two pieces may be aligned by registration features 1455, 1456 that are pegs, snaps, or the like.

FIG. 15 depicts a perspective view of an optical system in accordance with the present invention having a symmetrically truncated lens system assembly 1530. As can be seen, each lens has the adjoining edge 1509 and the outside edge 1507 truncated. Lens system assembly 1530 is attached to the encapsulate block 1525 with adhesive 1035. Aperture stop 1545, with opening 1550, is receivable over the lens system assembly 1030 and encapsulate block 1525.

FIG. 16 depicts a perspective view of an optical system constructed in accordance with the present invention having an asymmetrically truncated lens system assembly 1630. An aperture stop 1645, with opening 1650, snaps over encapsulate block 1625 to prevent light from entering the optical system other than through the lens surfaces. The aperture stop 1645 is secured to the printed circuit board 1615.

Figure 17:
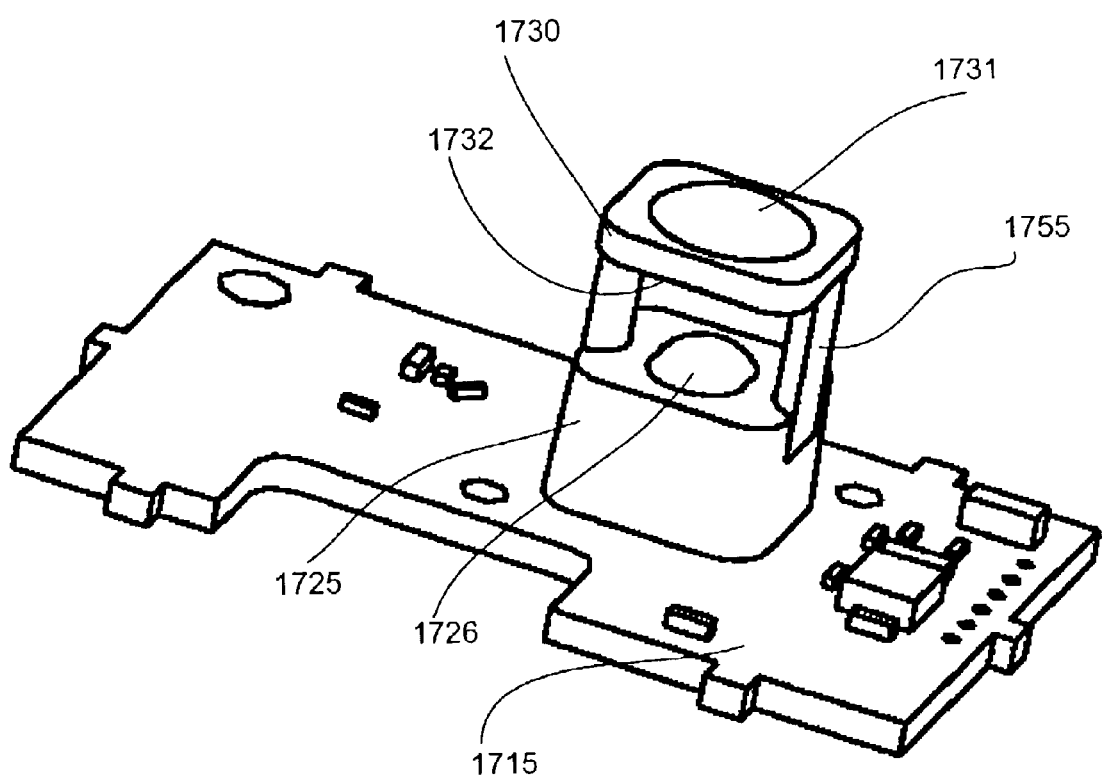
FIG. 17 depicts a perspective view of the optical system of FIG. 8.

FIG. 17 shows a perspective view of an optical system constructed in accordance with the manufacturing method of the present invention. Lens 1730 is attached to encapsulate block 1725 through posts 1755 molded integral with lens 1730. While two posts 1755 are shown, more posts may be used, or, registration may be achieved by a "skirt" around the entire lens system similar to those shown in FIGS. 15 and 16. Encapsulate block 1725, with optical surface 1726, combines with lens 1730, with optical surfaces 1731,1732, to form a lens system. Encapsulate block 1725 is cast over pixel array(not shown) and adheres to the printed circuit board 1715.

As mentioned above, FIG. 18 depicts an optical system in accordance with the present invention having a high-resolution lens system. Encapsulate block 1825 is molded over the pixel array (not shown) and adheres to the printed circuit board 1815. Encapsulate block 1825 has an associated optical surface 1826. Lens 1835 is cascaded with lens 1830 on top of encapsulate block 1825 with registration features 1855, 1856, 1857, 1858 providing the interconnections. Encapsulate block 1825, with optical surface 1826, combined with lens 1830, with optical surfaces 1831, 1832 and lens 1835, with optical surfaces 1833,1834 forms a lens system providing high resolution.

Conventional lens systems which allow for variable focus, variable focal length (zoom) and various aperture employ motorized actuators which move the lenses relative to each other and the image plane. Such systems are complex and costly and may not be suitable for all environments, particularly the high-vibration and extreme temperature in the automotive environment. As an alternative to the use of motorized components, piezoelectric materials may be used to move corresponding lens elements. Of particular interest is the use of a piezoelectric polymer, such as polyvinylidene fluoride (PVDF). A detailed description of the use of electro-active polymers for use in mechanical actuators is included in U.S. Published Patent Application No. 20010026265, hereby incorporated in its entirety by reference thereto.

Figure 19:
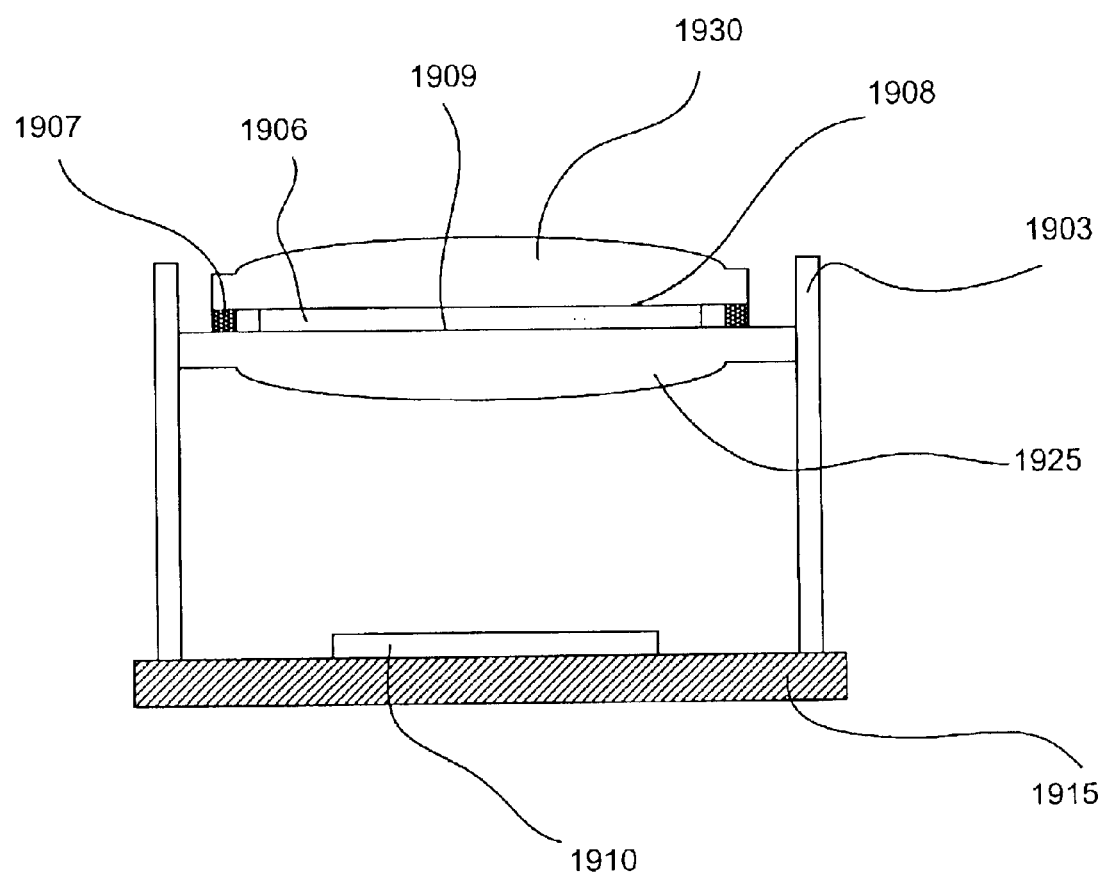
FIG. 19 depicts an optical system in accordance with the present invention having a variable focus lens system.

FIG. 19 illustrates an embodiment of the present invention that facilitates movement of optical elements. A bottom lens 1925 is attached rigidly to a support structure 1903 that suspends lens 1925 above a pixel array 1910 that is mounted onto a circuit board 1915. A top lens 1930 is attached to the bottom lens 1925 with an electro-active (piezoelectric) polymer 1906 therebetween. Another polymer seal 1907 provides for additional stiffness and, optionally, for pre-loading of polymer 1906. Seal 1907 may be implemented as a spring or other means of providing for stiffness and pre-loading, or, may be omitted in accordance with the present invention. Electrodes on surfaces 1908 and 1909 of lenses 1925 and 1930, provide for an electric field to be applied to polymer 1906 causing it to expand. Electrodes are preferably formed of an indium-tin-oxide (ITO) conductive transparent coating or other transparent conductor. Clips (not-shown) allow for electrical contact with the ITO coating.

Figure 20:
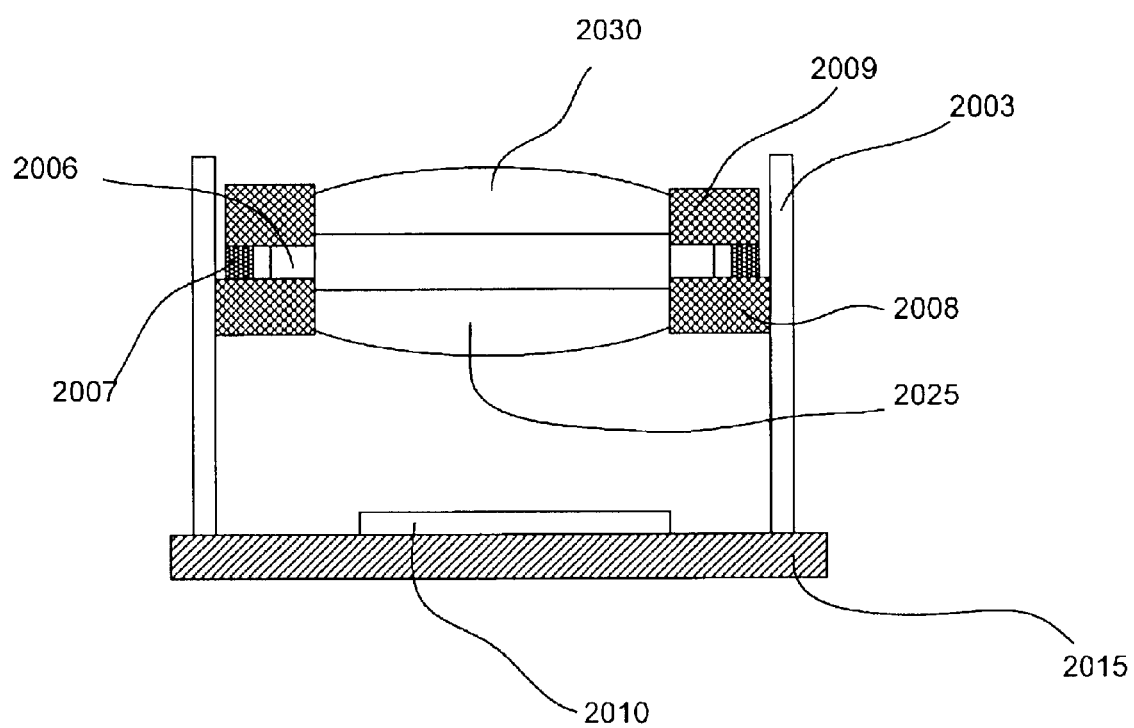
FIG. 20 depicts an alternate embodiment of an optical system in accordance with the present invention having a variable focus lens system.

In some cases, it may not be desirable to position the electro-active polymer in the optical path of the optical system. This may be due to limits in the transparency or other properties of the polymer or may be due to manufacturing issues. Another embodiment of an optical system in accordance with the present invention that employs an electro-active (piezoelectric) polymer, or non-polymer piezoelectric device, is shown in FIG. 20. In this embodiment, lens 2025 is fixed rigidly to support structure 2003 with a lens holder 2008, which may be a ring, surrounding lens 2025. Lens 2030 is held by lens holder 2009 which is connected to lens holder 2008 through piezoelectric device 2006 and material 2007. Material 2007 provides stiffness and preloading of piezoelectric device 2006, if necessary. Electrodes (not shown) may be contained in lens holders 2008, 2009. These lens holders may be separate components or may be molded, or integrated, with lenses 2025, 2026.

In yet another embodiment, a lens may be formed from a slightly pliable material, such as silicone. Lens holders may be formed of a piezoelectric device and designed to expand laterally when an electric field is applied, thus pinching the lens and causing its thickness and curvature to increase, thus changing the focus, or focal length, of the associated optical system.

The embodiments of the present invention depicted in FIGS. 19 and 20 are merely exemplary and are not intended to limit the present invention to any particular structure. Any number of variable focus lens systems may be used and may contain flat, convex or concave surfaces. Associated optical surfaces may be spherical, aspheric, diffractive, or may contain any other optically active, or passive, surface. Individual Lens systems may be molded from a polymer, may be glass or any other suitable material for visible, or non-visible, imaging. Any number of actuators may be used to vary the distance between any number of lenses or vary the distance between lenses and the sensor. Lenses may be moved for the purpose of establishing a desired focus, adjusting focal length or any other purpose. Focus, or focal length, may be adjusted by analyzing the image acquired by pixel array 1910 and setting the voltage to the actuators accordingly. The adjustment may also be set in manufacturing, under user control, by a secondary auto-focus sensor, or by a predetermined routine for a given application.

Figure 21:
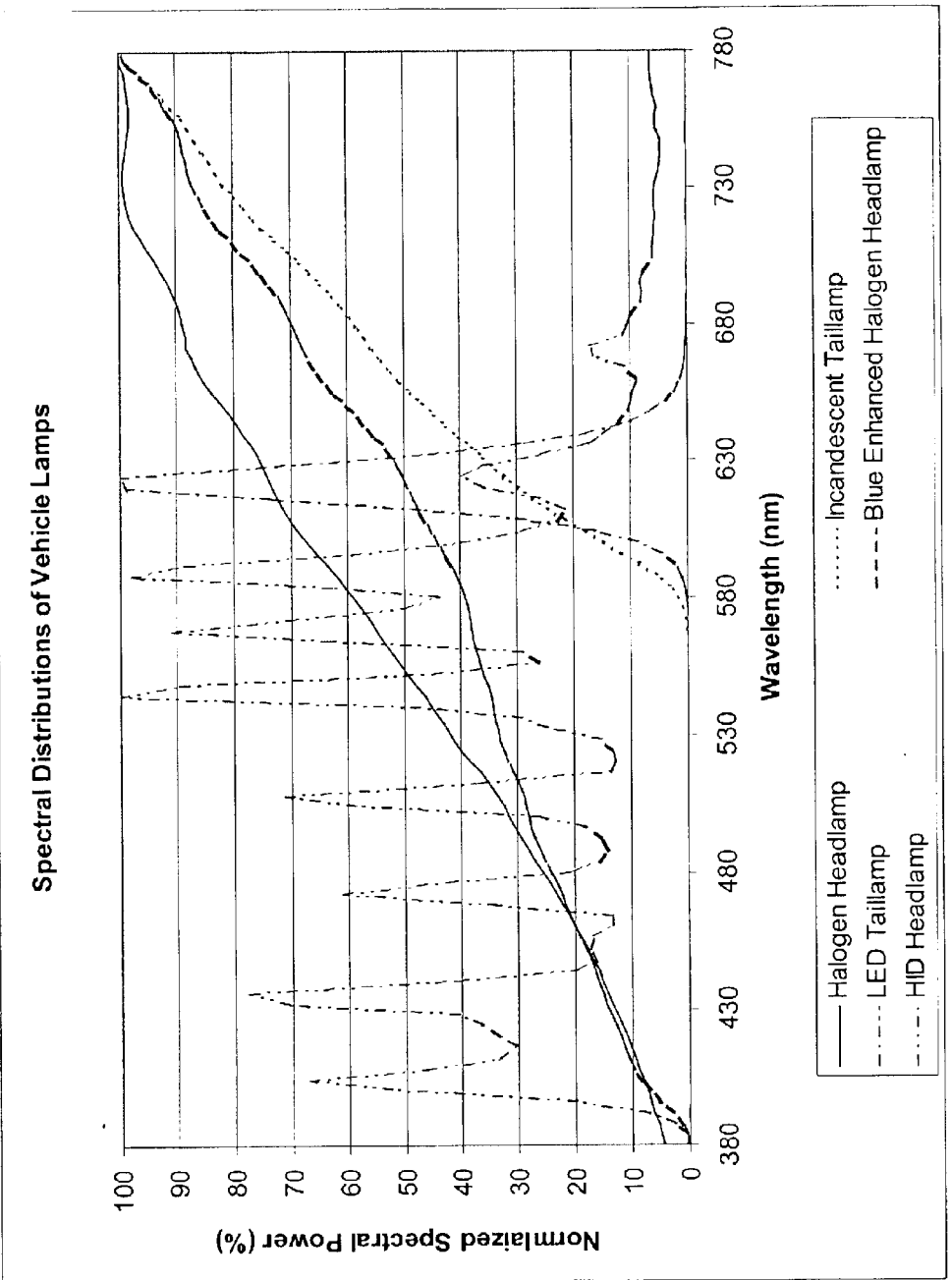
FIG. 21 depicts plots of the spectral distributions of various vehicle exterior lights.
Figure 22:
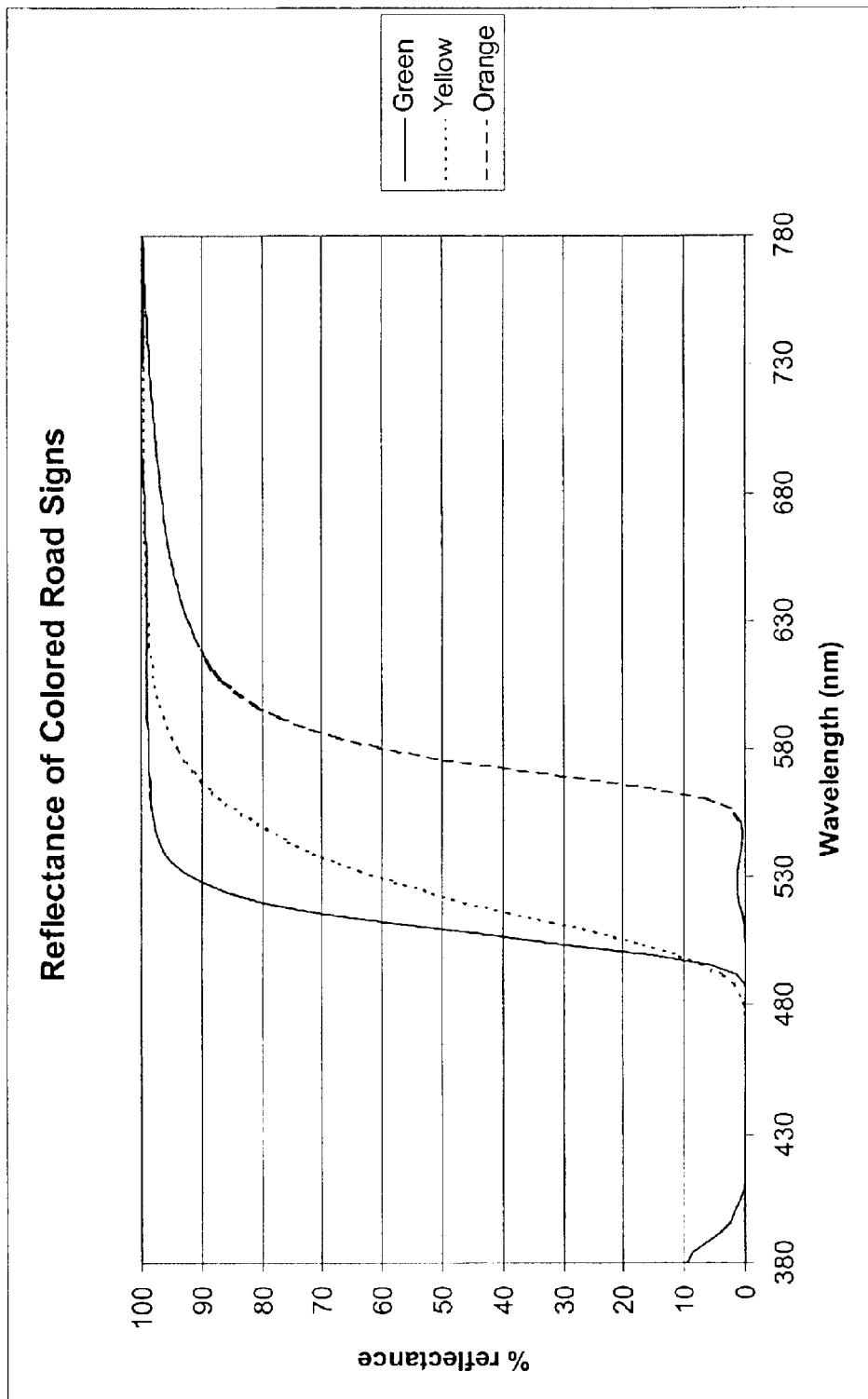
FIG. 22 depicts plots of the spectral reflectance ratios of various colored road signs.
Figure 23:
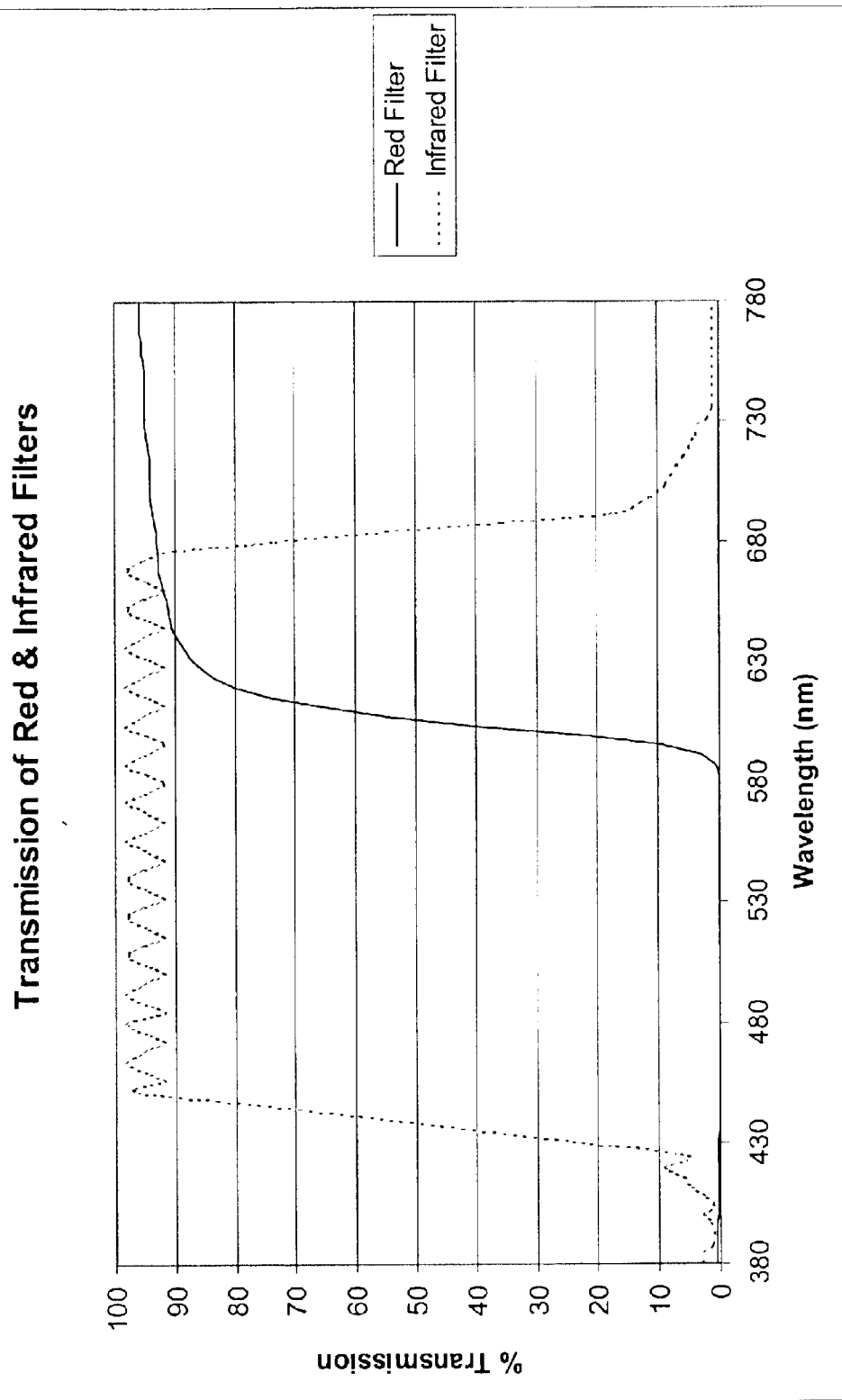
FIG. 23 depicts plots of transmission factors of red and infrared filter material in accordance with the present invention.
Figure 24:
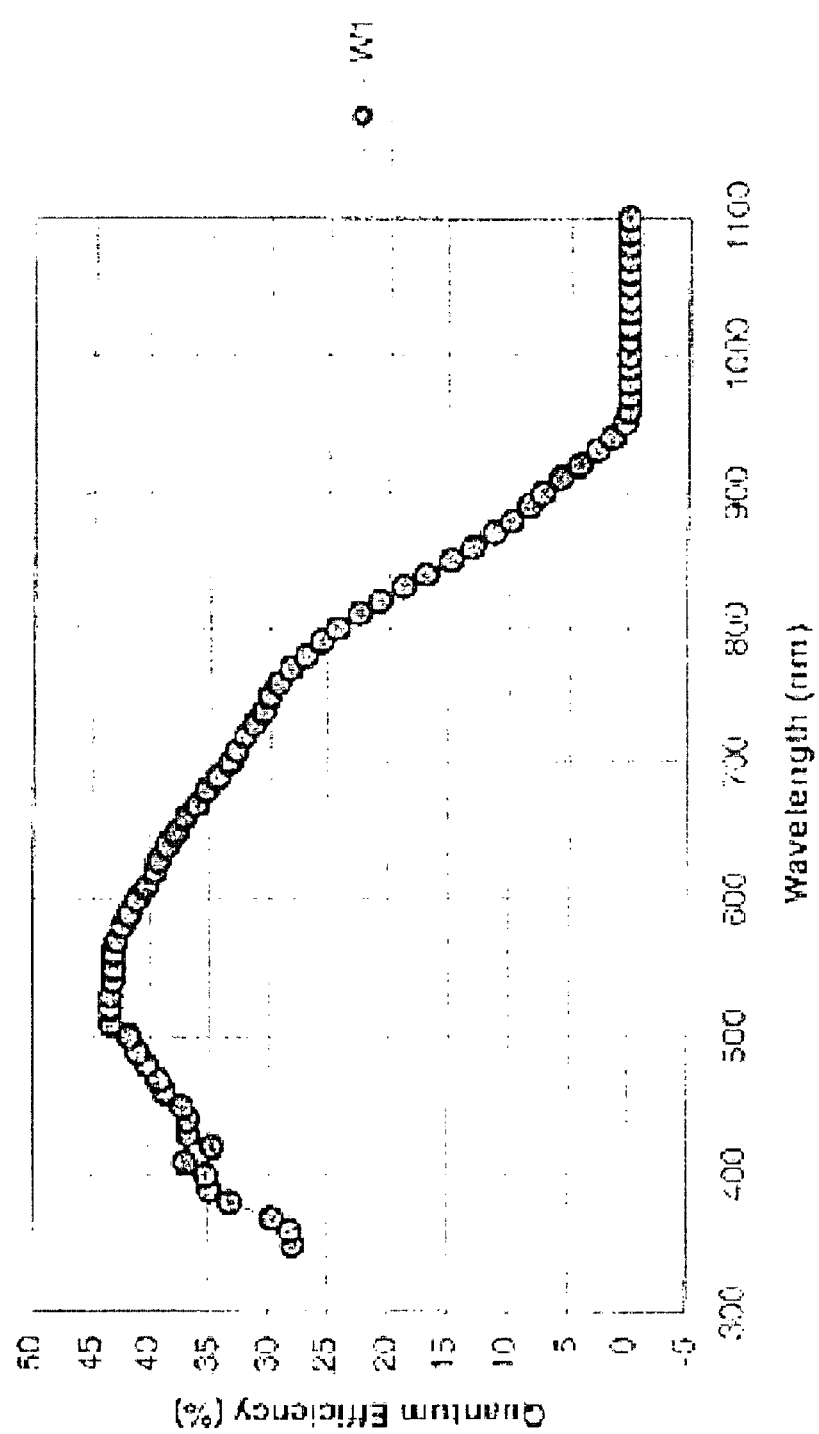
FIG. 24 depicts plots of the quantum efficiency versus wavelength for an optical system in accordance with the present invention.

In operation, an automatic vehicle exterior light control system should preferably be able to distinguish headlights of oncoming vehicles and taillights of leading vehicles from non-vehicular light sources or reflections off of signs and roadside reflectors. The ability to distinguish these various objects may be enhanced with optimal combination of various color, ultra-violet and infrared spectral filters. FIG. 21 depicts plots of the spectral content of different types of vehicular related light sources. FIG. 22 depicts plots of the spectral reflectance of various colored signs. FIG. 23 depicts plots of the percent transmission of red and infrared spectral filters used in a preferred embodiment of the present invention. FIG. 24 depicts a plot of the quantum effeciency of an optical system in accordance with the present invention. Numerical data depicted by the plots of FIGS. 21–24 is utilized, as described in detail below, to categorize various light sources.

The brightness of a given detected light source can be estimated by multiplying the spectral output of the source, as shown in FIG. 21, by the infrared spectral filter transmission factor, as shown in FIG. 23, multiplied by the spectral response of the pixel array, as shown in FIG. 24. For the red filtered pixels, this value is further multiplied by the transmission factor of the red spectral filter. The brightness of detected reflections from road signs can be estimated by multiplying the controlled vehicle's headlight spectral output, as shown in FIG. 21, by the spectral reflectance factor of the sign, as shown in FIG. 22, the infrared spectral filter transmission factor, as shown in FIG. 23, and the spectral response of the optical system, as shown in FIG. 24. For red spectral filtered pixels, the preceding result is then multiplied by the red spectral filter transmission factor, as shown in FIG. 23.

Figure 25:
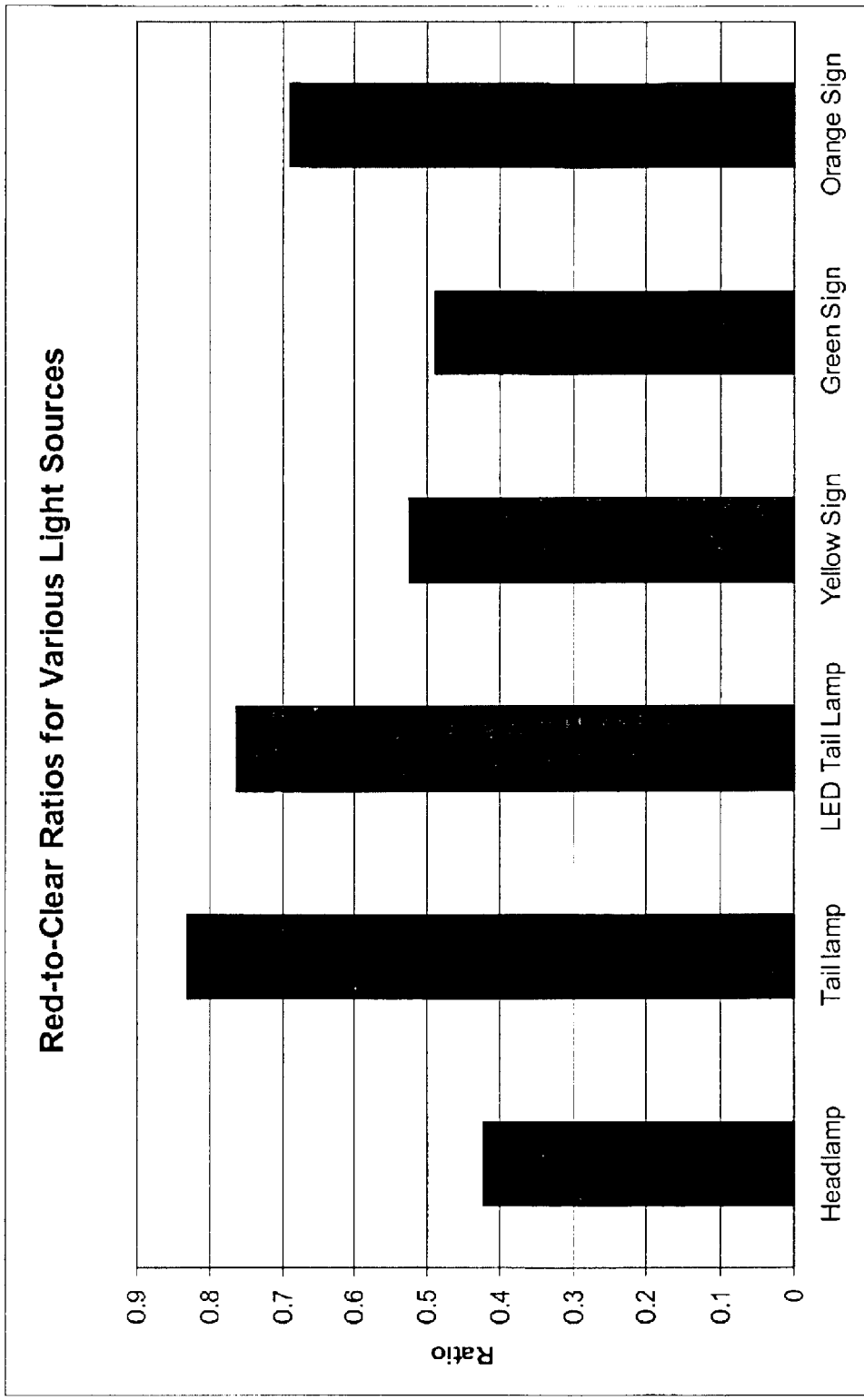
FIG. 25 depicts a graph of red-to-clear ratios for various light sources as detected by an optical system in accordance with the present invention.
Figure 26:
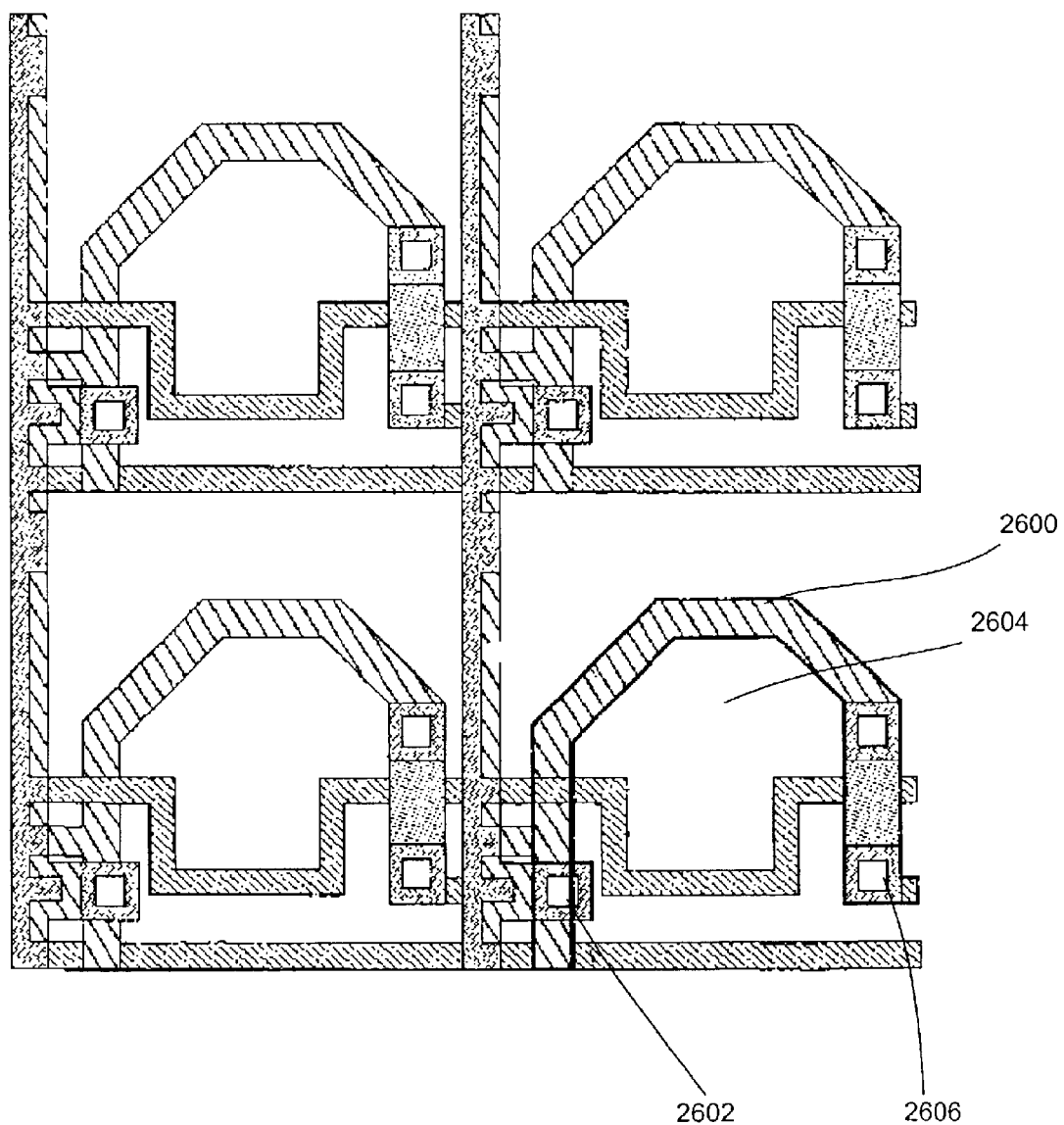
FIG. 26 depicts an exploded view of a group of four pixels of a known pixel array.

The ratio in brightness between the object projected onto the red filtered pixels in relation to the object projected onto the non-red filtered pixels can be used to determine the relative redness of an object. This ratio is then utilized to determine if the object is a taillight or a headlight. FIG. 25 depicts the computed ratios of the brightness of objects projected onto red filtered pixels relative to those same objects projected onto the non-filtered pixels. As shown in FIG. 25, taillights have a much higher red-to-clear ratio than headlights, or most other objects.

Discrimination amongst light sources can be further improved with the use of blue-enhanced headlights. Such headlight bulbs are commercially available and produce a bluer, or cooler, color light that more closely approximates natural daylight. These headlight bulbs are sometimes used in combination with high-intensity discharge (HID), low beam, lights to more closely match the color. Finally, Halogen-Infrared (HIR) bulbs, which contain a coating to reflect infrared light back into the bulb, have a cooler light output and may be used. HIR bulbs have the advantage of emitting less red light as a percentage of their total output, as shown in FIG. 21. As a result, the image of signs reflecting light will have a lower brightness on red filtered pixels than on non-red filtered pixels. Other light sources which emit less red light in proportion to the total amount of light may be advantageously used to minimize the false detection of road signs and reflections off of other objects; HID high beam lights and LED headlights are examples of such sources.

It is common to classify the color of white light sources (such as headlights) by their color temperature or correlated color temperature. Light sources with a high color have a more bluish hue and are, misleadingly, typically called "cool-white light" sources. Light sources with a more yellow or orangish hue have a lower color temperature and are, also misleadingly, called "warm white light" sources. Higher color temperature light sources have a relatively higher proportion of short wavelength visible light to long wavelength visible light. The present invention can benefit from the use of higher color temperature headlights due to the reduced proportion of red light that will be reflected by signs or other objects that could potentially be detected.

Correlated color temperature for non-perfect Planckian sources can be estimated by computing the color coordinates of the light source and finding the nearest temperature value on the Planckian locus. The color coordinates are calculated as well known in the art. The text entitled MEASURING COLOUR, second edition, by R. W. G. Hunt, incorporated in its entirety herein by reference, is one source for known teachings in the calculation of color coordinates. Using the CIE 1976 USC (u', v') color space a standard halogen headlight was measured to have color coordinates of u'=0.25 & v'=0.52. From these coordinates, a correlated color temperature of 3100K is estimated. The blue-enhanced headlight of FIG. 21 has color coordinates of u'=0.24 and v'=0.51 and thus a correlated color temperature of approximately 3700K. A measured high intensity discharge (HID) headlight has color coordinates of u'=0.21 and v'=0.50 and thus a correlated color temperature of 4500K. The present invention can benefit when the controlled vehicle is equipped with headlights having a correlated color temperature above about 3500K.

The computations described above were utilized to select the optimum combined red and infrared spectral filters to maximize the discrimination of taillights from other objects while still allowing for sufficient detection sensitivity. Preferably, a long wavelength pass, red, spectral filter having a 50% transmission point between 580 and 620 nanometers, most preferably at about 605 nm, is employed. Preferably, the infrared spectral filter is selected as a short wavelength pass filter having a 50% cutoff between 630 and 780 nanometers, more preferably between 640 and 700 nanometers and most preferably at 680 nanometers. Optical systems with greater sensitivity may benefit from IR filter cutoff wavelengths slightly less than 680 nm, most preferably at 660 nm.

In the examples presented below, the optical systems are designed and evaluated for performance for on-axis imaging to facilitate detection of small, distant, light sources. Typically, the resolution and sensitivity requirements with regard to off-axis light sources are significantly less since off-axis objects are only of interest for objects that are closer to the controlled vehicle. However, the teachings of the present invention are applicable to off-axis imaging in applications where more resolution and sensitivity are required; use of lens systems corrected for off-axis aberrations are preferable for these applications.

Once the desired filter material is incorporated into, or onto, either the lens system assembly or the pixel array and an encapsulate block is transfer molded over the pixel array, the lens system assembly is preferably placed relative the pixel array as follows. As described elsewhere herein, the lens system assembly and the encapsulate block may, alternatively, be transfer molded as one precision piece. Therefore, the following lens system assembly placement method is not utilized in all embodiments of the present invention.

Figure 27:
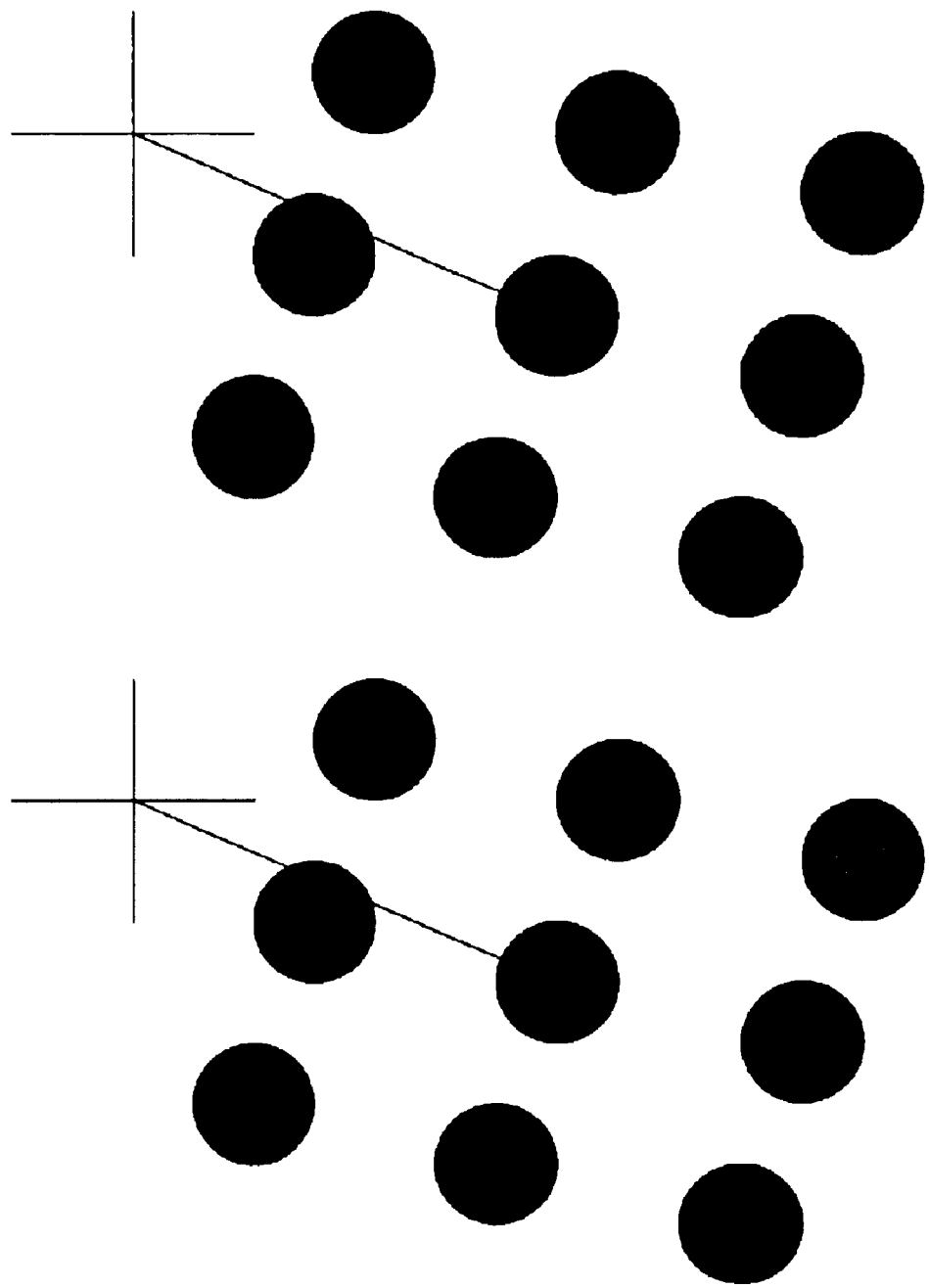
FIG. 27 depicts an array of 3×3 dots produced by a target and as projected by an optical system, in accordance with the present invention having a dual lens system assembly, onto a pixel array as a beginning point for the optical system manufacturing method in accordance with the present invention.
Figure 28:
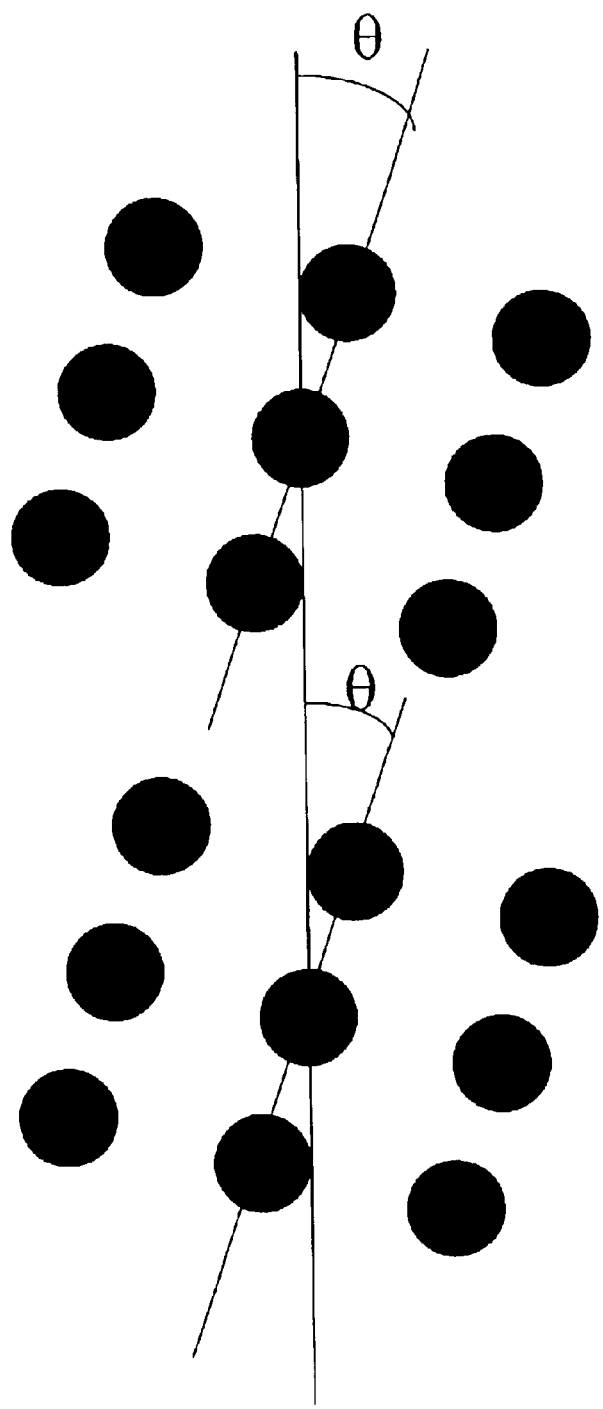
FIG. 28 depicts the dots as described with regard to FIG. 22 once the lens system and pixel array have been aligned with regard to the x and y coordinates.

The optical system in accordance with the present invention is preferably manufactured using a precision placement machine to accurately place the lens system proximate the pixel array. The manufacturing method in accordance with the present invention allows for providing a sharply focused optical system or a "blurred" optical system. The "blurred" optical systems in accordance with the present invention are either nearsighted, or farsighted, depending on the specific control requirements. Suitable multi-axis precision optical positioning systems are available from Physik Instrumente of Waldbronn, Germany and Burleigh Instruments of Victor, N.Y. Preferably, the positioning system moves the pixel array under the lens; the lens is fixed in space with respect to a target (preferably, the target is generated utilizing a backlit liquid crystal display (LCD)). The positioning system can locate the optimal position in each axis by moving the pixel array around underneath the lens system. It is also in accordance with the present invention to move the lens system while keeping the pixel array fixed in space. Preferably, the LCD generates an array of predetermined sized dots as depicted in FIGS. 27–29. Preferably an array of nine dots is generated for lens system placement.

The lens system and pixel array alignment process is preferably initiated by manually selecting a starting point; the positioning system is manipulated manually to a position such that at least one distinct dot is projected by the lens system onto the pixel array and detectable thereby. It is also in accordance with the present invention to program the positioning system to perform this initial lens system and pixel array placement. Most preferably, the mechanical tolerance achieved when loading the pixel array and lens system into the positioning system is such that at least one distinct dot will be imaged by the optical system.

A standard seed fill algorithm, as described in U.S. patent application Ser. No. 09/800,460 which is of common assignment herewith and is incorporated herein in its entirety by reference, is used with a high threshold to determine "objects" in the image. The seed fill is a recursive algorithm that rasters through an image until it finds a pixel whose grayscale value is above the given threshold. When such a pixel is found, it adds the given pixel to an object record. The identified pixel is zeroed in the image to prevent it from being counted twice. Each of its neighbors are examined to see if one or more of them exceed the threshold. If any neighboring pixels are bright enough, the seed fill algorithm runs on that pixel. The seed fill algorithm continues in successive fashion through all pixels of the pixel array.

In order to provide the highest flexibility possible when placing the lens system relative the pixel array, the only criteria for a starting point are that the focus is good enough to distinguish individual dots, and at least one dot is visible in the starting image. If these criteria are met, the preferred positioning system iteratively discovers the correct placement. If less than 18 dots (3×3 in red and 3×3 in white for the optical system of FIG. 3) are visible, a coarse correction algorithm is used. The preferred coarse correction algorithm is based on the bounding box of the dot, or dots, that are currently visible. By determining the minimum and maximum with regard to the x and y-axis, the algorithm determines which direction to correct the placement. The following is a simplification of the preferred coarse correction algorithm:

```
If ((rightX - maxX) > (minX - leftX))
    Move +X
Else
    Move -X
End
Where:
    rightX is the value of the right border coordinate
    maxX is the value of the right border of the bounding box
    leftX is the value of the left border coordinate
    minx is the value of the left border of the bounding box
```

Once all 18 dots are visible (with regard to a dual lens system assembly as in FIG. 3; 9 dots with regard to a single lens system as in FIG. 8), a fine X/Y correction method is preferably employed as follows. Mathematically it is known where the optical center of the optical system is. An attempt is made to move the group of 9 dots (3 rows by 3 columns) into the center of the image. A weighted average is used to determine the center of the dots; the "center of brightness" of the center dot in the group is then determined. The preferred fine correction formula for x-axis position placement is:

$$X_{COM} = \frac{\sum (x_i * Gv_i)}{\sum x_i}$$

where:
  $x_{com}$ is the x coordinate at the center of mass,
  $x_i$ is the individual x coordinate of the pixel in question
  $GV_i$ is the individual grayscale value of the pixel in question The y-axis fine position correction is calculated in a similar fashion. With regard to the optical system depicted in FIG. 3, the center dot in the red image will always fall in the 5$^{th}$ spot and the center dot in the white image will always be in the 14$^{th}$ spot, regardless of tilt, because a raster scan through all of the columns in each row is performed to complete the seed fill algorithm and a high threshold (typically a grayscale value at, or around, 80 LSBs) is used to filter out fringe pixels.

To most accurately calculate position, the above fine x/y correction calculations are preferably performed for each dot separately (assuming target position/spacing is known). Alternatively, a "center of brightness" calculation is performed on all of the dots in aggregate. However, it is difficult to line up all of the dots precisely on their respective target coordinates before rotation of the pixel array about z-axis (theta direction) is corrected.

Another option for X/Y placement in accordance with the present invention is to continue to use the bounding box (maximum and minimum in both x-axis and y-axis), assuming that the array of dots is symmetrical. However, this encounters the same problem as using all of the dots if rotation is not corrected first; the problem arises in situations where some of the dots are off the pixel array.

In theory, neither of these optional algorithms would be too far off from optimal in a high-resolution pixel array system because the errors in each axis would show up exactly the same in both the plus and minus directions. The center points of both boxes (angled and straight) are in the same point in space. However, with a low-resolution optical system, the error may be too great to produce a reliable, repeatable, metric.

In order to correct for angular error, the same seed fill algorithm is used to locate objects. The center locations of the dots in the middle column (3 red, 3 white) are extracted to determine an equation of a line that joins their centers of mass (same calculation of x/y correction). Preferably, the line is calculated through simple linear regression (least squares method). The error in theta is the tangent of the slope of the regressed line. By minimizing that angle, the proper theta position is located. Alternatively, the average of the lines through all columns of dots can be used to achieve a more accurate measure of rotational error.

Figure 31A:
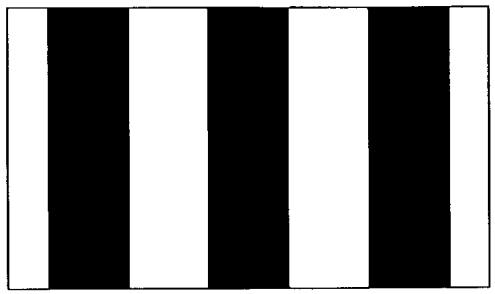
FIG. 31a depicts a low-frequency target pattern for use with the manufacturing method in accordance with the present invention.

Once the x-axis, y-axis and angular positions are established, the optical system is focused as follows. In order to find the sharpest focus point for the optical system, the target pattern is preferably changed from dots to a set of narrow vertical lines as depicted in FIG. 31a; this is one advantage of using an LCD to generate the target. In theory, the focus is sharpest where the lines are most highly resolved (assuming the individual lines are not wider than one pixel).

Figure 30A:
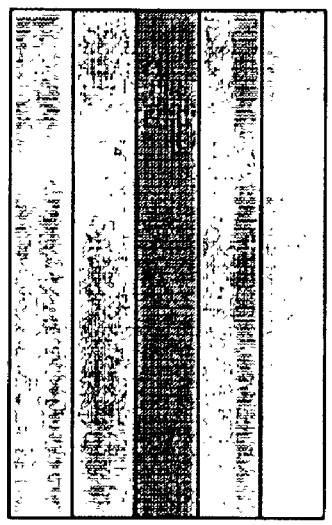
FIG. 30a depicts an image of a target with vertical lines as captured using an optical system with low resolution as manufactured in accordance with the method of the present invention.
Figure 30B:
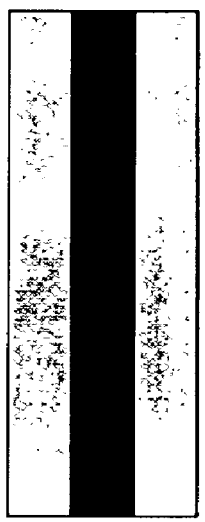
FIG. 30b depicts an image of a target pattern with vertical lines as captured using an optical system with high resolution as manufactured in accordance with the method of the present invention.

The sharpest point of focus is found using a simple averaging of the grayscale values (grayscale values above the seed fill's threshold) to find the point at which the lines of the target are resolved the highest. Sharp focus is detected by searching, first in coarse steps, subsequently in fine steps, until a point two steps past the peak resolution is found. Once a down slope is detected in line resolution, the pixel array is backed off to the highest measured point, and that position is denoted as providing sharpest focus. FIG. 30a depicts a low resolution image of the line pattern 30b of a corresponding target.

An alternative method is to use a number of small dots, in lieu of lines, to determine sharpest focus. In this scenario, the precision placement machine moves the pixel array in the z-axis direction until the dots resolve to their highest resolution and smallest values. A large number of dots provides some averaging, and better noise immunity than using a single dot. This method works similar to the line method; simply locating the maximum of resolution and the minimum of average size. Once those peaks are passed, the z-axis height can be moved back into the ideal position.

Another method of focusing the optical system in accordance with the present invention is to use one large dot. Similar to the use of several small dots, preferably, the single large dot provides a large number of pixels over which to average the results. The downside of this method is that saturation of the central pixels can be problematic, saturation would create misleading results for determining sharpest focus.

In another lens system placement method in accordance with the present invention, the centroids of an array of 3×3 dots is used to measure the focal length (and thus the focus) of the optical system. The further the lens is located from the pixel array, the further apart the objects will be projected by the lens system onto the array. Since the target size is predetermined, the lens system can be moved until the images of the dots appear at a predetermined spacing on the pixel array. Tilt in both the x and y dimensions can be corrected in a similar fashion. Tilt in either direction will make the dot pattern appear trapezoidal as shown in FIG. 29. The difference in object spacing between the top and bottom rows, or the left and right rows, can be used to measure, and thus correct, for tilt.

A final method to focus the optical system in accordance with the present invention is to use a "resolution test" as detailed below. By directly measuring the resolving capability of the optical system, the desired focus position can be determined consistently.

As discussed above, it has been discovered that, in certain scenarios such as for detection of distant taillights, defocusing the optical system provides better results than placing the lens system at the sharpest point of focus. This "blurring" has several desirable effects, including acting as an optical low pass filter to prevent image aliasing and reducing the pixel-to-pixel variance when imaging that which would otherwise be "sub-pixel sources."

Figure 31B:
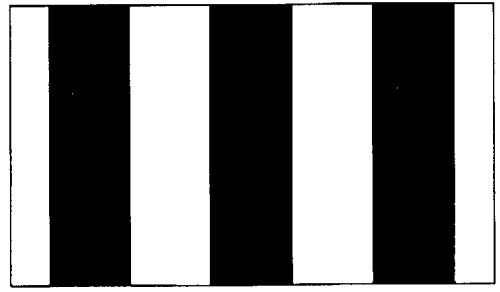
FIG. 31b depicts an image of the target pattern of FIG. 26a utilizing an optical system in accordance with the present invention having a low frequency cutoff.
Figure 32A:
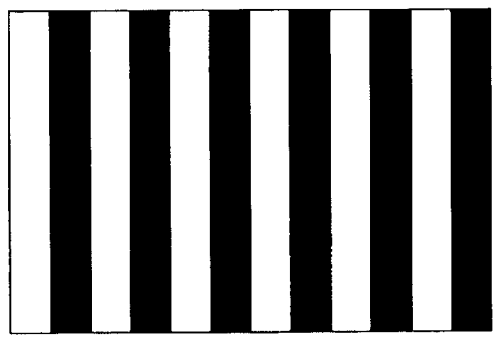
FIG. 32a depicts a mid-frequency target pattern for use with the manufacturing method in accordance with the present invention.
Figure 32B:
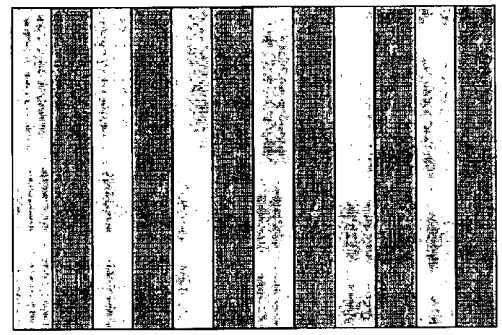
FIG. 32b depicts an image of the target pattern of FIG. 27a utilizing an optical system in accordance with the present invention having a low frequency cutoff.
Figure 33A:
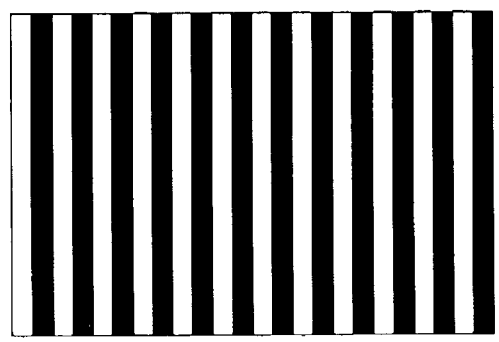
FIG. 33a depicts a high-frequency target pattern for use with the manufacturing method in accordance with the present invention.
Figure 33B:
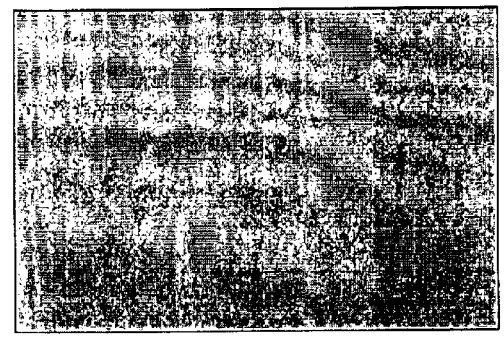
FIG. 33b depicts an image of the target pattern of FIG. 28a utilizing an optical system in accordance with the present invention having a low frequency cutoff.
Figure 34:
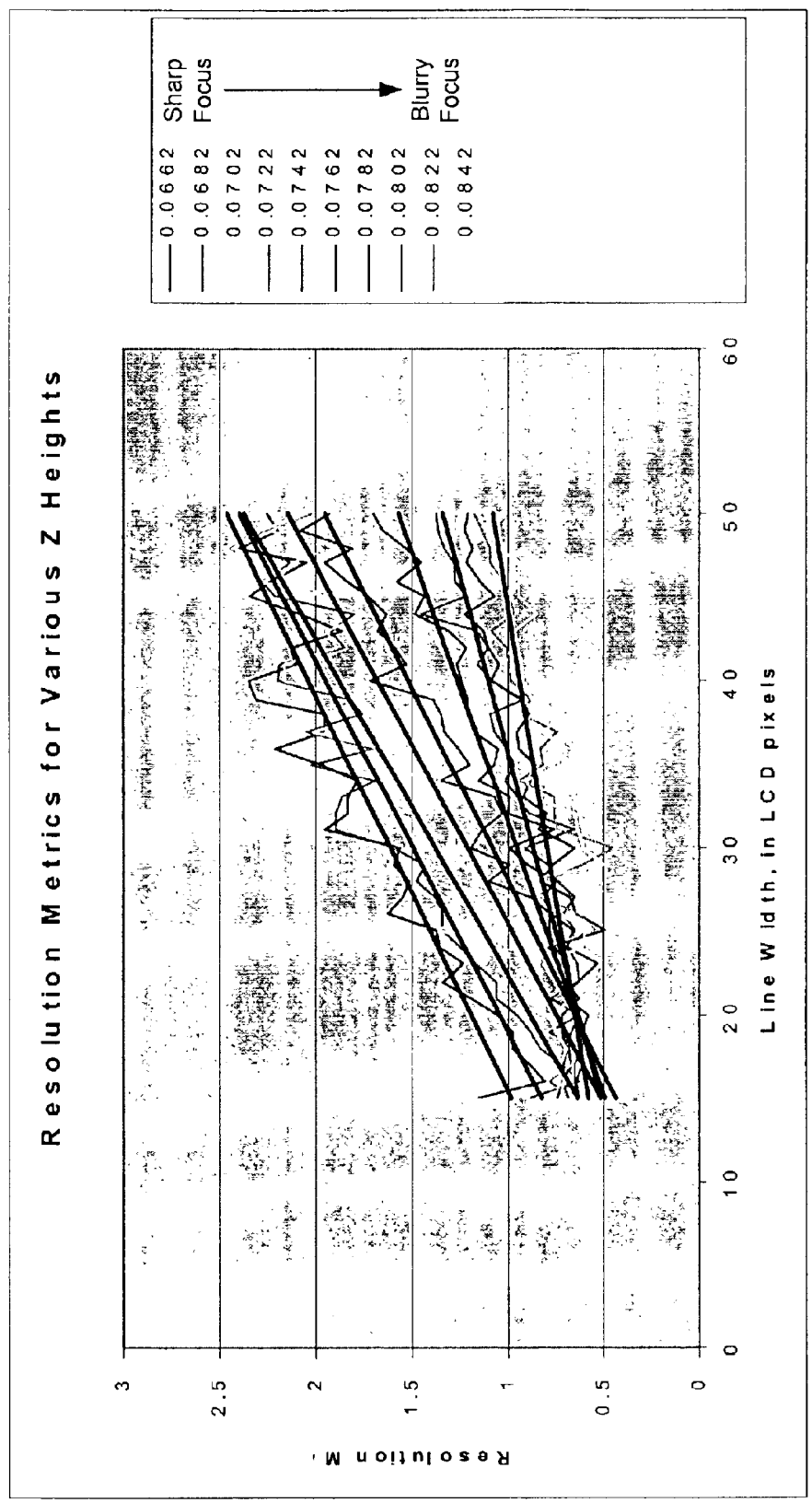
FIG. 34 depicts a plot of the resolution metrics for various Z-axis heights with superimposed linear representations.

To provide part-to-part defocusing uniformity, a test was developed that directly measures the minimum angle that the pixel array can resolve, this translates into a measure of focus. The resolution test preferably uses equal-sized, alternating bars of light and dark in the target as depicted in FIGS. 31a, 32a, and 33a. For each image (or average of several images to eliminate noise), the preferred software calculates the Fourier transform of each row. The Fourier transform translates the spatial domain signal (similar to a sine wave in grayscale values) to the spatial frequency domain. The fundamental frequency of the sine wave will show up as an obvious peak in the frequency domain. However, as the lines get closer together and the magnitude of the waveform captured gets closer to DC (i.e., approximately a flat line), the peak is reduced as shown in FIGS. 31b, 32b, and 33b. Due to the fact that a discrete Fourier transform is employed, ripples are observed in the results as depicted in FIG. 34. By taking a linear regression of the peak metric, the point where the regressed line crosses a chosen level on the y axis is located. The corresponding point in the x-axis direction is the minimum angle that can be resolved.

Figure 35:
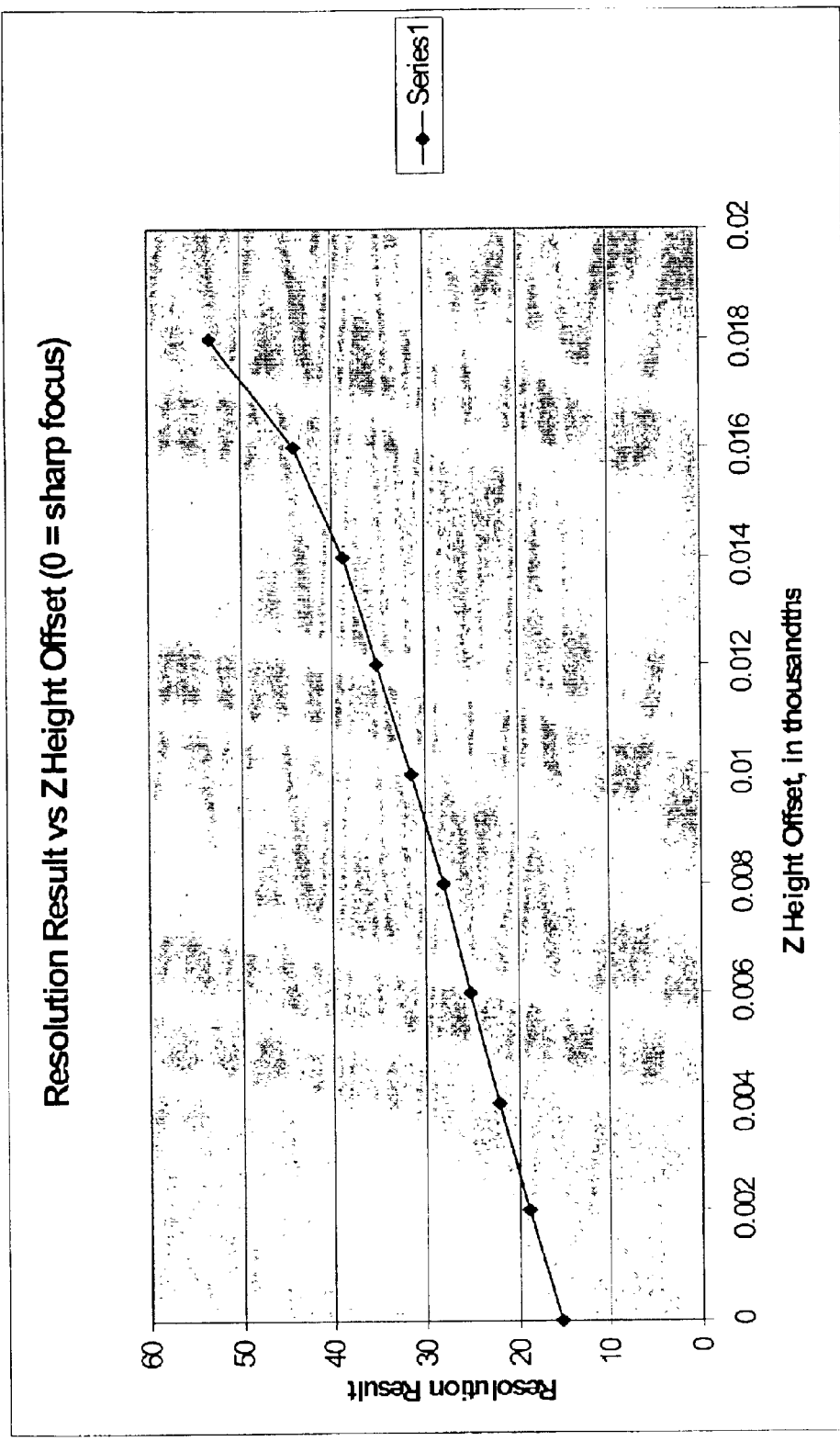
FIG. 35 depicts a plot of the resolution result for various Z-axis heights where zero on the x and y axis equals sharp focus.

The graphs as shown in FIG. 34 depict both the measured resolution metric (the peak of the DFT along with its nearest neighbors) and the regression line that best fits it. As the line moves away from sharpest focus, the point at which the regression line crosses 1.0, the chosen resolution point moves consistently and predictably to the right, indicating a larger minimum angle. For clarity, the point at which the lines cross 1.0 in the y-axis direction is denoted to be the resolution result, and that result is plotted as a function of the z-axis offset from sharp focus (at x=0). The result is a well-behaved metric that is very valuable as depicted in FIG. 35.

Once an angular specification for the target to be resolved is established and a level at which the resolution metric moves from resolved to unresolved is determined, a repeatable, directly measurable, level of defocus is set that is consistent across individual optical systems. When the parameter for fuzziness(blurriness)/sharpness is selected, the rows of dots are normalized (i.e. each pixel in a given row is divided by the maximum grayscale value for the associated pixel in that row, making the high point of each row exactly 1.0) prior to running the Fourier transform. This allows the sharpness metric to be set to 1.0. Above 1.0, the image is considered to be acceptably sharp and resolved. Below 1.0, the image is fuzzy(blurry) and unresolved. In a preferred embodiment, the standard for defocusing lenses is 0.75 degrees. This provides optimum system performance for the detection of small, distant, taillights. Other values, 0.75 plus or minus 0.1, will be more appropriate in different applications and are in accordance with the present invention.

Other methods of constructing an optical system in accordance with the present invention will be appreciated by those skilled in the art. For example, the pixel array may be contained in a package and soldered onto the circuit board as shown in FIG. 9. The lens system may attach to a pixel array package or may attach to the printed circuit board through the use of a lens system mount. Examples of various pixel array packaging methods are contained in U.S. Pat. No. 6,130,448, to Bauer et al., entitled "Optical Sensor Package and Method of Making Same" and hereby incorporated by reference thereto.

Analysis of the optical systems in accordance with the present invention can be performed using Zemax lens design software available from Focus Software Inc., of Tucson Ariz. The analysis of the optical systems of the examples contained herein was performed utilizing this software. Detailed explanations of the analysis methods used in the following discussions can be found in the Zemax 10.0 Users Guide and the book entitled "Practical Computer-Aided Lens Design" by Gregory Hallock Smith, both of which are incorporated herein by reference thereto. Also, for the purposes of this discussion, the term "sharpest focus" will refer to the optical parameters that achieve the minimum theoretical geometric root-mean-square (RMS) spot size on the image plane for parallel light rays of the primary design wavelength entering the lens system normal to the entrance aperture of the first lens. Since a primary consideration of the optical system in accordance with the present invention is detection of distant taillights, a primary design wavelength of 620 nm is selected for the following examples. A summary of some key optical properties used for analysis in the examples is given in Table 1. Actual properties may vary from those specified and other materials may be used, varying the results of the analysis accordingly. All simulations in the examples contained herein are performed for an ambient temperature of 23° C.

| Material | Index of Refraction (n) at 587 nm | Abbe Number (v) |
| --- | --- | --- |
| Nitto 300H | 1.569 | 31.14 |
| Norland-68 | 1.492 | 55.31 |
| Polycarbonate | 1.585 | 29.91 |

The following examples are intended as further representations of the present invention for illustrative purposes and in no way should be interpreted as limiting the scope of the present invention. As will be appreciated by the skilled artisan, the present invention can embody a host of optical system characteristics to satisfy particular desires.

EXAMPLE 2

Figure 36:
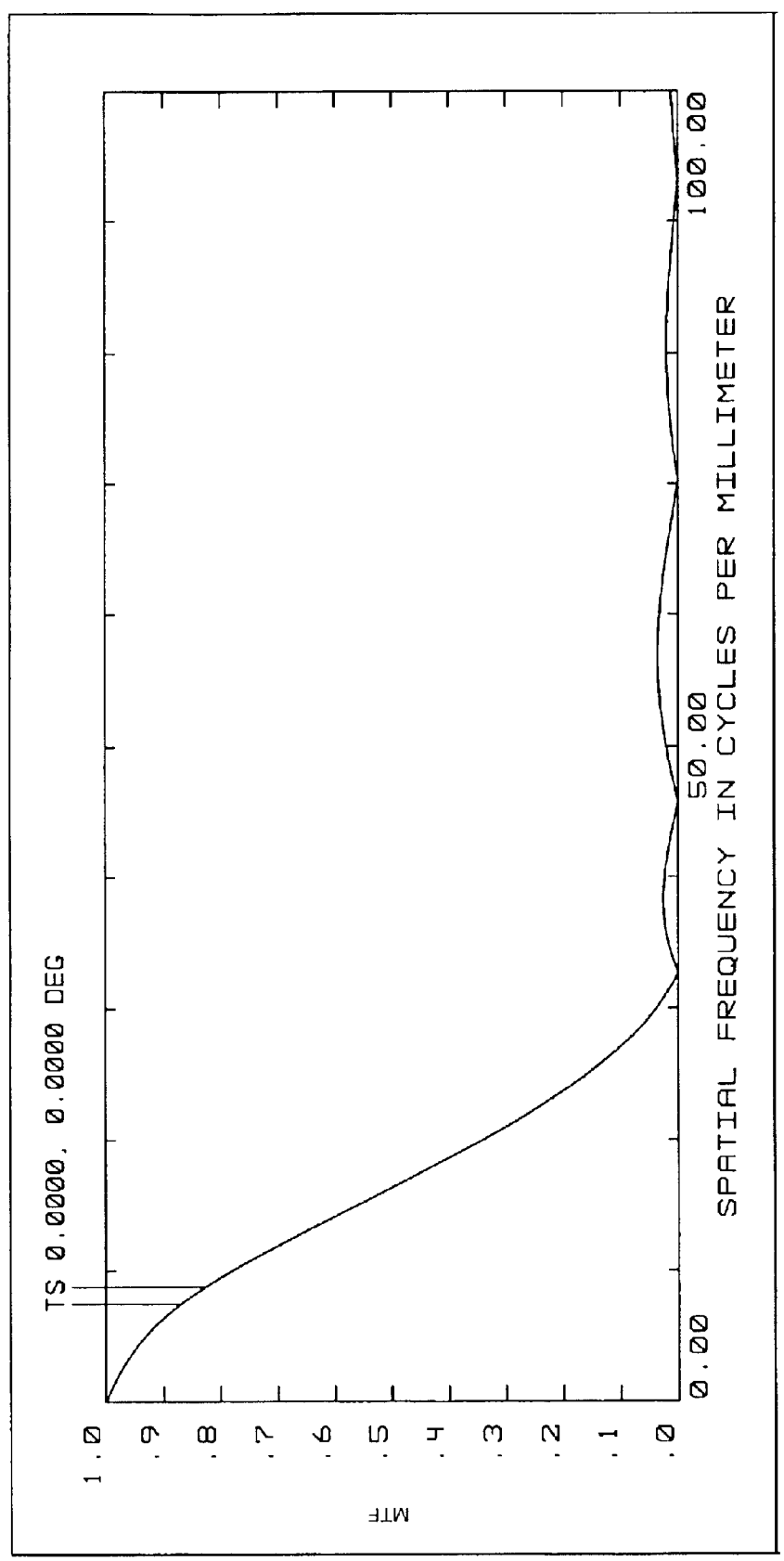
FIG. 36 depicts a modulation transfer function plot for the optical system of example 2 described herein in accordance with the present invention.

The optical system of this example of the present invention employs a high resolution pixel array to achieve a wider field of view and greater discrimination of distinct light sources. A 176 pixels horizontal×144 pixels vertical pixel array (commonly referred to as quarter-common image format (QCIF)) containing 15 μm pixels is used. The configuration of the optical system is as shown in FIG. 3. Lens systems with a diameter of 3.5 mm, a radius of curvature of 2.15 mm and a conic constant of −0.4 are used. The lens system assembly is 3.0 mm thick (dimension A as shown in FIG. 3), the adhesive layer is 0.25 mm thick (dimension B as shown in FIG. 3) and the encapsulate block is 2.5 mm thick (dimension C as shown in FIG. 3). Sub-windows of 120 pixels horizontal by 50 pixels vertical on each half of the pixel array are used for a field of view of approximately 29° horizontal×12° vertical (approx. 0.24°/pixel). FIG. 36 depicts a MTF plot of the optical system of this example using a wavelength of 620 nm. The absolute spatial frequency cutoff of the optical system is approximately 32 cycles/mm, just less than the pixel array's Nyquist frequency limit of 33.3 cycles/mm.

As an alternate construction of the optical system of this example the lens system assembly and the encapsulate block are transfer molded as one piece. The radius of curvature of each lens system is adjusted to compensate for the change in total index of refraction. The radius of curvature is set to 2.10 mm and the total thickness of material from the tip of the lens system to the surface of the pixel array chip is 5.75 mm.

EXAMPLE 3

Figure 37:
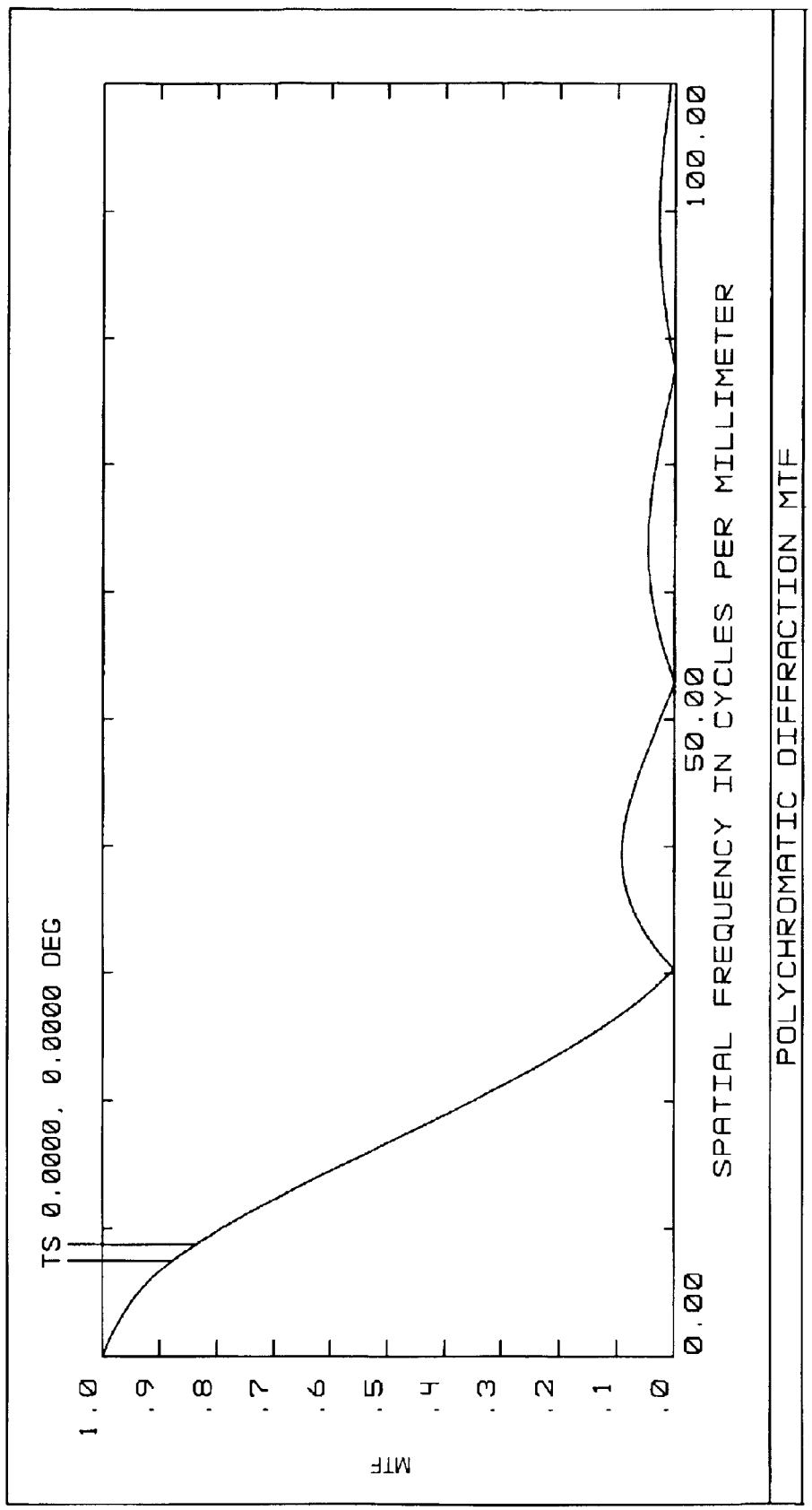
FIG. 37 depicts a modulation transfer function plot for the optical system of example 3 described herein in accordance with the present invention.

A 352 pixels horizontal×288 pixels vertical pixel array (commonly referred to as a common image format (CIF)), containing 7.9 $\mu$m pixels, is used in this example. The optical system of this example is constructed as shown in FIG. 8. The lens system has a diameter of 4.0 mm, a radius of curvature of 2.375 mm, and a conic constant of −0.4. The distance from the top of the lens to the surface of the pixel array is 6.5 mm (dimension A as shown in FIG. 8). A window of 280 pixels horizontal×120 pixels vertical is used providing a field of view of 32° horizontal by 14° vertical. The MTF plot of the optical system of this example is shown in FIG. 37. The absolute spatial frequency cutoff of this optical system is approximately 31 cycles/mm. Since the spectral filter material is preferably as shown in either FIG. 11a or 11b, the pixel pitch should be considered to be twice the pixel dimension, or 15.8 $\mu$m. Therefore, the associated pixel array Nyquist frequency limit is ½d=31.6 cycles/mm.

In the preferred embodiment of the present invention, color measurement is achieved by comparing the image formed through the red filter on one half of the array with the corresponding image formed on the other half without the filter. Color measurement, as described above, is applicable to optical systems constructed in accordance with the embodiment as depicted in FIG. 3.

Another method of determining the color of light sources, applicable to optical systems constructed as depicted in FIG. 8 involves the patterning of a checkerboard filter pattern on the pixel array such that adjacent pixels are exposed to different spectral bands of light. This spectral filter pattern can be a simple checkerboard pattern of alternating red filtered and non-filtered pixels. Alternatively, this pattern could be a checkerboard of alternating red and cyan filters. A conventional color filter mosaic or stripe pattern consisting of alternating primary red/green/blue filters or complementary cyan/yellow/magenta filters are in accordance with the present invention. In these alternate embodiments of the present invention, color is determined by interpolating the values of the adjacent different color pixels to determine the actual color of the object imaged. While this technique is very suitable for conventional imaging of large objects, which subtend solid angles greater than the solid angle imaged by each pixel, this technique will not adequately suffice for color discrimination of small, distant, light sources which subtend angles less than that imaged by a single pixel. The limitation introduced in the case of the tiled filter approach is overcome by limiting the spatial frequency response of the optical system, as described above, such that accurate color measurement of small, distant, point sources is possible.

By providing for more accurate intensity (brightness) measurement and color measurement of point light sources, the present invention enables the use of more sophisticated software techniques for distinguishing between the headlights and taillights of other vehicles and non-vehicular light sources. For example, reflections from a controlled vehicle's headlights off of signs may be distinguished by monitoring a change in brightness of an object with a corresponding change in the controlled vehicle's high beam brightness. If such a correlation is detected, the object is likely a sign, or other object, reflecting light from the controlled vehicle's headlights. Reflective objects will increase in brightness proportional to the square of the distance traveled by the controlled vehicle between consecutive frames, which can be determined by the controlled vehicle's speed. By accurately detecting the change in the brightness of the reflection, reflective objects can be ignored.

The red color of distant taillights in an image is often diluted by surrounding ambient light or reflections of the controlled vehicle's high beams off of the back or bumper of a leading vehicle. This problem is especially pronounced when the controlled vehicle is following a semi truck with a reflective, or partially reflective, back. However, distant taillights of a leading vehicle will have relatively constant intensity and remain in approximately the same position in the image for a period of time. Detection of distant taillights can be improved by monitoring the relative consistency of brightness and position. For objects that exhibit consistent brightness and color over several frames, the thresholds for brightness and redness can be reduced, thereby, improving detection of taillights. False detecting of stationary nuisance light sources is prevented by waiting a sufficient number of frames for such objects to have passed out of the image before reducing the thresholds. Additional object recognition techniques are described in U.S. patent application Ser. No. 09/799,310, the disclosure of which is incorporated herein by reference thereto.

As with the human eye, an optimum optical system in accordance with the present invention may incorporate a variable focus lens system. In operation, the vehicle exterior light control system, analogous to the human eye, varies the focus of the associated lens system and, or, the corresponding focal length between being focused on objects far in front of the controlled vehicle to being focused on objects near the front of the controlled vehicle. Images of the scene forward of the controlled vehicle are acquired while the optical system is focused at various distances. Also in accordance with the present invention, a three-dimensional representation is obtained when two, or more, spatially separated optical systems are employed. Thereby, the advantages of stereographic vision are exploitable. As will be recognized by the skilled artisan, a vision system with multiple optical systems, variable focal length and variable focus lens systems is relatively costly and complex. However, multiple, discretely focused, optical systems in accordance with the present invention are combined to emulate a vision system that provides an equivalent series of images. Lens systems with varying focal length (eg. a zoom lens) or multiple lens systems with different focal lengths, may be provided to provide different fields of view and thus vary the ability to resolve distant objects or image a very wide area. Optical systems that accommodate a variety of focus points and, or, provide a variety of focal lengths, either by incorporating multiple lenses and multiple image sensors or by providing variable optics, are contemplated and within the scope of the present invention. Such a vision system may facilitate features in addition to lighting control such as rain sensing, pre-crash sensing, adaptive cruise control, lane-departure warning, night vision, and other vehicle control and vision applications. Additionally, optical systems with automatic, or manual, vertical tilt and, or, horizontal pan are within the scope of the present invention. Such flexibility may also compensate for variability in the optical system with temperature or manufacturing variances.

Recognizing the desire to obtain images of the associated scene at various focal points, and ignoring economics, multiple spatially separated optical systems with infinitely variable lens systems, large pixel arrays with small individual pixel size, and R/G/B filter material as in FIG. 11a would be integrated with a processor with infinite speed and memory. It should be appreciated that optical systems in accordance with the present invention will evolve with improvements and reduced cost in these related components. A single sensor, a one dimensional array of sensors or a two dimensional array of sensors may be utilized to facilitate automatic vehicle exterior light control in accordance with the present invention.

While the many aspects of the present invention are particularly suited for the development of an automatic vehicle exterior lighting control system, many additional applications of the invention are contemplated and thus the invention should not be perceived as limited to vehicle lighting control or any other specific purpose. Since many of the aspects of the present invention contribute to the production of a low-cost, robust, optical system, many other imaging applications for use in vehicles would readily benefit from these aspects. Non-vehicular optical systems would also benefit. For example, a low cost machine vision system which tracks the position or orientation of objects may be constructed according to the embodiments and methods presented herein. A vision system that tracks the location of a point light source (i.e. a LED contained on an object) may be useful for a variety of purposes. Aspects of the present invention may even be useful for film cameras or other applications wherein the electronic image sensor is replaced with another means of acquiring an image.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A light source detection and classification system, for use in an automatic vehicle exterior light control system, capable of detecting small, distant, light sources, comprising:
   at least one optical system with a spatial frequency cutoff; and
   at least one pixel array with a Nyquist frequency limit, wherein said spatial frequency cutoff is less than, or equal, to said Nyquist frequency limit.

2. A light source detection and classification system as in claim 1 wherein said at least one optical system having a lens system assembly that projects light rays emitted by an 8 to 20 centimeter diameter, red, taillight assembly, located between 100 and 250 meters away from said lens system assembly, onto a pixel array such that said projected light rays substantially spans at least one pixel pitch.

3. A light source detection and classification system as in claim 2, wherein said projected light rays comprise an associated brightness and said at least one optical system provides for accurate measurement of said brightness.

4. A light source detection and classification system as in claim 2, wherein said projected light rays comprise an associated peak wavelength and said at least one optical system provides for accurate identification of said peak wavelength.

5. A light source detection and classification system as in claim 2, wherein said projected light rays comprise an associated dominant wavelength and said at least one optical system provides for accurate identification of said dominant wavelength.

6. A light source detection and classification system as in claim 1, wherein said light sources comprise an associated brightness and said light source detection and classification system provides for accurate measurement of said brightness.

7. A light source detection and classification system as in claim 1, wherein said light sources comprise an associated peak wavelength and said light source detection and classification system provides for accurate identification of said peak wavelength.

8. A light source detection and classification system as in claim 1, wherein said light sources comprise an associated dominant wavelength and said light source detection and classification system provides for accurate identification of said dominant wavelength.

9. A light source detection and classification system as in claim 1, further comprising at least one spectral filter material disposed between said light sources and said pixel array.

10. A light source detection and classification system as in claim 9 capable of distinguishing headlights of oncoming vehicles from taillights of leading vehicles.

11. A light source detection and classification system as in claim 9 capable of distinguishing headlights of oncoming vehicles from other light sources.

12. A light source detection and classification system as in claim 9 capable of distinguishing taillights of leading vehicles from other light sources.

13. A light source detection and classification system as in claim 9, wherein said at least one spectral filter material is a pigment.

14. A light source detection and classification system as in claim 13, wherein said pigment is inorganic.

15. A light source detection and classification system as in claim 9, wherein said at least one spectral filter material is placed on said pixel array.

16. A light source detection and classification system as in claim 9, further comprising an encapsulate block, wherein said at least one spectral filter material is incorporated into said encapsulate block.

17. A light source detection and classification system as in claim 9, further comprising an encapsulate block, wherein said at least one spectral filter material is placed on said encapsulate block.

18. A light source detection and classification system as in claim 9, further comprising an encapsulate block and a lens system assembly, wherein said lens system assembly is attached to said encapsulate block and said at least one spectral filter material is disposed between said encapsulate block and said lens system assembly.

19. A light source detection and classification system as in claim 9, further comprising a lens system assembly, wherein said at least one spectral filter material is incorporated into said lens system assembly.

20. A light source detection and classification system as in claim 9, further comprising a lens system assembly, wherein said at least one spectral filter material is placed on said lens system assembly.

21. A light source detection and classification system as in claim 1, further comprising a photochromic spectral filter disposed between said light sources and said pixel array.

22. A light source detection and classification system as in claim 1, further comprising an electrochromic spectral filter disposed between said light sources and said pixel array.

23. A light source detection and classification system as in claim 1, further comprising an encapsulate block and a lens system assembly, said lens system assembly is attached to said encapsulate block.

24. A light source detection and classification system as in claim 23, further comprising a printed circuit board, said pixel array is attached to said printed circuit board and said encapsulate block is molded over said pixel array and attached to said printed circuit board.

25. A light source detection and classification system as in claim 23, wherein said lens system is attached to said encapsulate block with a UV curable adhesive.

26. A light source detection and classification system as in claim 1, further comprising an aperture stop.

27. A light source detection and classification system as in claim 1, further comprising a far field baffle.

28. A light source detection and classification system as in claim 1 further comprising:
at least one pigment spectral filter material disposed between light sources to be detected and said at least one pixel array.

29. A light source detection and classification system as in claim 28, wherein said at least one pigment spectral filter material is red.

30. A light source detection and classification system as in claim 29, wherein said pigment spectral filter material has a fifty-percent transmission point between 580 and 620 nanometers.

31. A light source detection and classification system as in claim 30, wherein said pigment spectral filter material has a fifty-percent transmission point at 605 nanometers.

32. A light source detection and classification system as in claim 28, wherein said at least one pigment spectral filter material is infrared.

33. A light source detection and classification system as in claim 29, wherein said pigment spectral filter material has a fifty-percent transmission point between 630 and 780 nanometers.

34. A light source detection and classification system as in claim 30, wherein said pigment spectral filter material has a fifty-percent transmission point between 640 and 700 nanometers.

35. A light source detection and classification system as in claim 30, wherein said pigment spectral filter material has a fifty-percent transmission point at 680 nanometers.

36. A light source detection and classification system as in claim 30, wherein said pigment spectral filter material has a fifty-percent transmission point at 660 nanometers.

37. A light source detection and classification system as in claim 28, wherein pixels of one contiguous half of said pixel array are filtered with said spectral filter material.

38. A light source detection and classification system as in claim 28, wherein individual pixels of said pixel array are filtered with said spectral filter material such that alternating stripes of filtered and unfiltered pixels are defined.

39. A light source detection and classification system as in claim 28, wherein individual pixels of said pixel array are filtered with said spectral filter material such that a checkerboard pattern of filtered and unfiltered pixels is defined.

40. A light source detection and classification system as in claim 28, wherein a red spectral filter material, a green spectral filter material and a blue spectral filter material are disposed between said light sources to be detected and said pixel array.

41. A light source detection and classification system as in claim 40, wherein twice as many pixels of said pixel array are red filtered as compared to the number of pixels either green or blue filtered.

42. A light source detection and classification system as in claim 40, wherein individual pixels of said pixel array are filtered such that a Bayer pattern is defined.

43. A light source detection and classification system as in claim 1 further comprising:
a red spectral filter material disposed between reflected light rays to be detected and said at least one pixel array.

44. A light source detection and classification system as in claim 43, further comprising an infrared filter material disposed between reflected light rays to be detected and the light ray detection and classification system.

45. A light source detection and classification system as in claim 43, further comprising headlights having high color temperature.

46. A light source detection and classification system as in claim 43, wherein said color temperature is greater than 3500 Kelvin.

47. A light source detection and classification system as in claim 43, wherein said color temperature is 3700 Kelvin.

48. A light source detection and classification system as in claim 46, wherein said color temperature is greater than 4500 Kelvin.

49. A light source detection and classification system as in claim 43, wherein said at least one headlight is high intensity discharge.

50. A light source detection and classification system as in claim 43, wherein said at least one headlight is at least one light emitting diode.

51. A light source detection and classification system as in claim 43, wherein said at least one headlight is halogen-infrared.

52. A light source detection and classification system as in claim 43, wherein said at least one headlight is halogen.

53. A light source detection and classification system as in claim 43, wherein said at least one headlight is blue enhanced halogen.

54. A light source detection and classification system as in claim 43, wherein pixels of one contiguous half of said pixel array are filtered with said spectral filter material.

55. A light source detection and classification system as in claim 43, wherein individual pixels of said pixel array are filtered with said spectral filter material such that alternating stripes of filtered and unfiltered pixels are defined.

56. A light source detection and classification system as in claim 43, wherein individual pixels of said pixel array are filtered with said spectral filter material such that a checkerboard pattern of filtered and unfiltered pixels is defined.

57. A light source detection and classification system as in claim 43, further comprising a green spectral filter material and a blue spectral filter material disposed between said light sources to be detected and said pixel array.

58. A light source detection and classification system as in claim 57, wherein twice as many pixels of said pixel array are red filtered as compared to the number of pixels either green or blue filtered.

59. A light source detection and classification system as in claim 57, wherein individual pixels of said pixel array are filtered such that a Bayer pattern is defined.

60. An optical system, for use in an automatic vehicle exterior light control, capable of detecting small, distant, light sources, comprising:
   at least one pixel array having a plurality of pixels; and
   a modulation transfer function that first drops to $e^{-1}$ at a spatial frequency that is less than, or equal to, the reciprocal of the minimum center-to-center distance between any two adjacent pixels.

61. An optical system as in claim 60, wherein said distant light source emits light rays that comprise an associated brightness and said optical system provides for accurate measurement of said brightness.

62. An optical system as in claim 60, wherein said distant light source emits light rays that comprise an associated peak wavelength and said optical system provides for accurate identification of said peak wavelength.

63. An optical system as in claim 60, wherein said distant light source emits light rays that comprise an associated dominant wavelength and said optical system provides for accurate identification of said dominant wavelength.

64. An optical system as in claim 60, further comprising at least one spectral filter material disposed between said light sources to be detected and said pixel array.

65. An optical system as in claim 64, wherein said at least one spectral filter material is a pigment.

66. An optical system as in claim 65, wherein said pigment is inorganic.

67. An optical system as in claim 60, further comprising a photochromic spectral filter disposed between said light sources to be detected and said pixel array.

68. An optical system as in claim 60, further comprising an electrochromic spectral filter disposed between said light sources to be detected and said pixel array.

69. An optical system as in claim 60, further comprising an encapsulate block and a lens system assembly, said lens system assembly is attached to said encapsulate block.

70. An optical system as in claim 69, further comprising a printed circuit board, said encapsulate block is attached to said printed circuit board.

71. An optical system as in claim 70, wherein said lens system assembly is attached to said encapsulate block with a UV curable adhesive.

72. An optical system as in claim 60, further comprising an aperture stop.

73. An optical system as in claim 69, further comprising a far field baffle.

74. An optical system, for use in an automatic vehicle exterior light control, capable of detecting small, narrow spectral band, distant light sources, comprising:
   at least one pixel array having a plurality of pixels, at least a portion of said pixels being spectral filtered; and
   a polychromatic modulation transfer function that first drops to $e^{-1}$ at a spatial frequency that is less than, or equal top the reciprocal of the minimum center-to-center distance between any two similarly filtered pixels.

75. An optical system as in claim 74, wherein said distant light source emits light rays that comprise an associated brightness and said optical system provides for accurate measurement of said brightness.

76. An optical system as in claim 74, wherein said distant light source emits light rays that comprise an associated peak wavelength and said optical system provides for accurate identification of said peak wavelength.

77. An optical system as in claim 74, wherein said distant light source emits light rays that comprise an associated dominant wavelength and said optical system provides for accurate identification of said dominant wavelength.

78. An optical system as in claim 74, further comprising at least one spectral filter material disposed between said light sources and said pixel array.

79. An optical system as in claim 78, wherein pixels of one contiguous half of said pixel array are filtered with said spectral filter material.

80. An optical system as in claim 78, wherein individual pixels of said pixel array are filtered with said spectral filter material such that alternating stripes of filtered and unfiltered pixels are defined.

81. An optical system as in claim 78, wherein individual pixels of said pixel array are filtered with said spectral filter material such that a checkerboard pattern of filtered and unfiltered pixels is defined.

82. An optical system as in claim 78, wherein a red spectral filter material, a green spectral filter material and a blue spectral filter material are disposed between said light sources to be detected and said pixel array.

83. An optical system as in claim 81, wherein twice as many pixels of said pixel array are red filtered as compared to the number of pixels either green or blue filtered.

84. An optical system as in claim 81, wherein individual pixels of said pixel array are filtered such that a Bayer pattern is defined.

85. An optical system as in claim 74, wherein said at least one spectral filter material is a pigment.

86. An optical system as in claim 74, wherein said pigment is inorganic.

87. An optical system as in claim 74, further comprising a photochromic spectral filter disposed between said light sources to be detected and said pixel array.

88. An optical system as in claim 74, further comprising an electrochromic spectral filter disposed between said light sources to be detected and said pixel array.

89. An optical system as in claim 74, further comprising an encapsulate block and a lens system assembly, said lens system assembly is attached to said encapsulate block.

90. An optical system as in claim 89, further comprising a printed circuit board, said pixel array is attached to said printed circuit board and said encapsulate block is molded over said pixel array and is attached to said printed circuit board.

91. An optical system as in claim 90, wherein said lens system assembly is attached to said encapsulate block with a UV curable adhesive.

92. An optical system as in claim 74, further comprising an aperture stop.

93. An optical system as in claim 74, further comprising a far field baffle.

94. An optical system as in claim 60 further comprising:
   a lens system that projects a distant, point source, of light onto a pixel array such that said projected distant point source of light substantially spans at least one pixel pitch.

95. An optical system as in claim 94, wherein said distant, point source, of light is in the range of 5 to 15 centimeters in diameter and located between 100 and 250 meters from said optical system.

96. An optical system as in claim 94, wherein said projected distant, point source, of light substantially covers at least two pixel pitches.

97. An optical system as in claim 94, wherein said distant, point source, of light is monochromatic.

98. An optical system as in claim 60 further comprising:
a dual lens system assembly for projecting a field of view onto a pixel array such that a first image of said field of view is formed on a first portion of said pixel array and a second image of said field of view is formed on a second portion of said pixel array; and
at least one pigment spectral filter material disposed between said field of view and said pixel array.

99. An optical system as in claim 98, wherein said spectral filter material is disposed such that said first image is filtered and said second image is unfiltered.

100. An optical system as in claim 98, further comprising an infrared spectral filter material disposed between said field of view and said pixel array.

101. An optical system as in claim 98, wherein each lens system of said dual lens system assembly is symmetrically truncated.

102. An optical system as in claim 60 further comprising:
a dual lens system assembly for projecting a field of view onto a pixel array such that a first image of said field of view is formed on a first portion of said pixel array and a second image of said field of view is formed on a second portion of said pixel array, wherein each lens system of said dual lens system assembly is symmetrically truncated.

103. An optical system as in claim 60 further comprising:
a pixel array attached to a printed circuit board; and
an encapsulate block molded over said pixel array and attached to said printed circuit board.

104. An optical system as in claim 103, wherein said encapsulate block is precision transfer molded.

105. An optical system as in claim 103, further comprising a lens system assembly attached to said encapsulate block.

106. An optical system as in claim 105, wherein said lens system assembly is attached to said encapsulate block with UV curable adhesive.

107. An optical system as in claim 105, wherein said encapsulate block comprises registration features and said lens system assembly comprises mating features, said lens system assembly is attached to said encapsulate block with said mating features being received by said registration features.

108. An optical system as in claim 103, further comprising micro lenses on each pixel within said pixel array.

109. An optical system as in claim 103, further comprising a light ray scattering film disposed proximate said pixel array.

110. An optical system as in claim 103, wherein said encapsulate block comprises an optical surface and functions as a lens system assembly.

111. An optical system as in claim 103, further comprising a plurality of cascaded lens systems, said encapsulate block having mating features and each of said lens systems having registration features and mating features for interconnection of said lens systems and said encapsulate block.

112. An optical system as in claim 103, further comprising a variable focal length lens system assembly.

113. An optical system as in claim 103, further comprising a variable focus lens system.

114. An optical system as in claim 103, further comprising a lens system assembly that provides achromatic aberration correction.

* * * * *